(12) United States Patent
Alvarez et al.

(10) Patent No.: US 12,545,158 B2
(45) Date of Patent: Feb. 10, 2026

(54) METHODS AND DEVICES FOR A VEHICLE

(71) Applicant: Intel Corporation, Santa Clara, CA (US)

(72) Inventors: Ignacio J. Alvarez, Portland, OR (US); Nese Alyuz Civitci, Portland, OR (US); Maria Soledad Elli, Hillsboro, OR (US); Javier Felip Leon, Hillsboro, OR (US); Florian Geissler, Munich (DE); David Israel Gonzalez Aguirre, Portland, OR (US); Neslihan Kose Cihangir, Munich (DE); Michael Paulitsch, Ottobrunn (DE); Rafael Rosales, Unterhaching (DE); Javier S. Turek, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 987 days.

(21) Appl. No.: 17/469,932

(22) Filed: Sep. 9, 2021

(65) Prior Publication Data
US 2021/0402898 A1    Dec. 30, 2021

(51) Int. Cl.
B60N 2/50    (2006.01)
B60N 2/00    (2006.01)

(52) U.S. Cl.
CPC .......... B60N 2/501 (2013.01); B60N 2/0022 (2023.08); B60N 2/0028 (2023.08);
(Continued)

(58) Field of Classification Search
CPC .... B60N 2/501; B60N 2/002; B60N 2210/50; B60N 2/0022; B60N 2/0028;
(Continued)

(56) References Cited

U.S. PATENT DOCUMENTS

2018/0089901 A1    3/2018 Rober et al.
2020/0070694 A1*   3/2020 Duan ............... B60N 2/501
(Continued)

OTHER PUBLICATIONS

Rolnick, A. et al., "Why is the driver rarely motion sick? The role of controllability in motion sickness" Ergonomics, 1991, vol. 34, No. 7, pp. 867-879.
(Continued)

Primary Examiner — James J Lee
Assistant Examiner — Andrew Sang Kim
(74) Attorney, Agent, or Firm — VIERING, JENTSCHURA & PARTNER mbB

(57) ABSTRACT

Devices and methods for a vehicle are provided in this disclosure. A device for controlling an active seat of a vehicle may include a processor and a memory. The memory may be configured to store a transfer function. The processor may be configured to predict an acceleration of the active seat of the vehicle based on a first sensor data and the transfer function. The first sensor data may include information indicating an acceleration of a vibration source for the vehicle. The processor may be further configured to generate a control signal to control a movement of the active seat at a first instance of time based on the predicted acceleration. Furthermore, the processor may be configured to adjust the transfer function based on a second sensor data including information indicating a detected acceleration of the active seat at the first instance of time.

20 Claims, 14 Drawing Sheets

(52) U.S. Cl.
CPC ...... *B60N 2210/24* (2023.08); *B60N 2210/50* (2023.08); *B60N 2220/10* (2023.08); *B60N 2220/20* (2023.08); *B60N 2220/30* (2023.08); *B60N 2230/10* (2023.08); *B60N 2230/20* (2023.08); *B60N 2230/30* (2023.08)

(58) Field of Classification Search
CPC ............ B60N 2210/24; B60N 2220/10; B60N 2220/20; B60N 2220/30; B60N 2230/10; B60N 2230/20; B60N 2230/30; B60N 2/0268; G06V 10/82; G06V 20/56
See application file for complete search history.

(56) References Cited

U.S. PATENT DOCUMENTS

| | | | |
|---|---|---|---|
| 2021/0114553 A1* | 4/2021 | Awtar | B60N 2/0244 |
| 2021/0146803 A1* | 5/2021 | Wu | B60W 50/0097 |

OTHER PUBLICATIONS

Iskander, J. et al., "From car sickness to autonomous car sickness: A review", Transportation Research Part F62: traffic psychology and behaviour, 2019, vol. 62, pp. 716-726.

Tal, D. et al., "Artificial Horizon Effects on Motion Sickness and Performance", Otology and Neurotology, 2012, vol. 33, Issue 5, pp. 878-885.

Turner, M. et al., "Motion sickness in public road transport: The relative importance of motion, vision and individual differences", British Journal of Psychology, 1999, vol. 90, Issue 4, pp. 519-530.

Ishak, S., et al., "Visual Occlusion Decreases Motion Sickness in a Flight Simulator", Perception, 2018, vol. 47, Issue 5, pp. 521-530.

Wada, T. et al., "Can Passengers' Active Head Tilt Decrease The Severity of Carsickness?—Effect of Head Tilt on Severity of Motion Sickness in a Lateral Acceleration Environment—", Human factors, 2012, vol. 54, Issue 2.

McGill, M. et al., "I am the passenger: How Visual Motion Cues Can Influence Sickness For In-car VR", Proceedings of the 2017 chi conference on human factors in computing systems, 2017, pp. 5655-5668.

Crane B. T., "Perception of combined translation and rotation in the horizontal plane in humans", Journal of Neurophysiology, 116(3), 2016, pp. 1275-1285, doi: 10.1152/jn.00322.2016.

Mueller, T. et al., "Can You Feel the Difference? The Just Noticeable Difference of Longitudinal Acceleration", Proceedings of the Human Factors and Ergonomics Society 57th Annual Meeting, 2013, pp. 1219-1223, doi: 10.1177/1541931213571271.

M. J. Griffin, "Discomfort from feeling vehicle vibration", Vehicle System Dynamics, 45:7-8, 679-698, DOI: 10.1080/00423110701422426.

Bae, I. et al., "Toward a Comfortable Driving Experience for a Self-Driving Shuttle Bus", Electronics 2019, 8, 943, doi: 10.3390/electronics8090943.

Ibicek, T. et al., Quantification of human discomfort in a vehicle using a four-post rig excitation, Journal of Low Frequency Noise, Vibration and Active Control, 31(1), 2012, pp. 29-42. doi: 10.1260/0263-0923.31.1.29.

Johansson R. S. et al., "Sensorimotor Control of Manipulation", in Encyclopedia of Neuroscience. Elsevier Ltd, 2009, 14 pages.

* cited by examiner

METHODS AND DEVICES FOR A VEHICLE

TECHNICAL FIELD

This disclosure generally relates to methods and devices for a vehicle.

BACKGROUND

Occupants of a vehicle are subject to movements of the vehicle that may vary with various accelerations in many directions. These movements may cause certain discomfort for the occupants. Such discomfort may even arise as a motion sickness for some occupants especially when the brain of an occupant cannot make sense of stimuli sensed by various senses of the occupant. Stimuli include vestibular, visual, and proprioceptive stimuli. Vehicle systems generally employ various types of sensors in order to monitor a feature or an attribute that may be related to the vehicle or the environment. The usage of sensors is generally linked to various aspects that are related to the vehicle, such as control of the vehicle, safety, navigation, operation of semi-autonomous/autonomous driving functions, state of components, the performance of the vehicle, emissions, and comfort of an occupant of the vehicle. It may be desirable to use sensors in a vehicle with an intention to reduce the discomfort caused by the movements of the vehicle.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
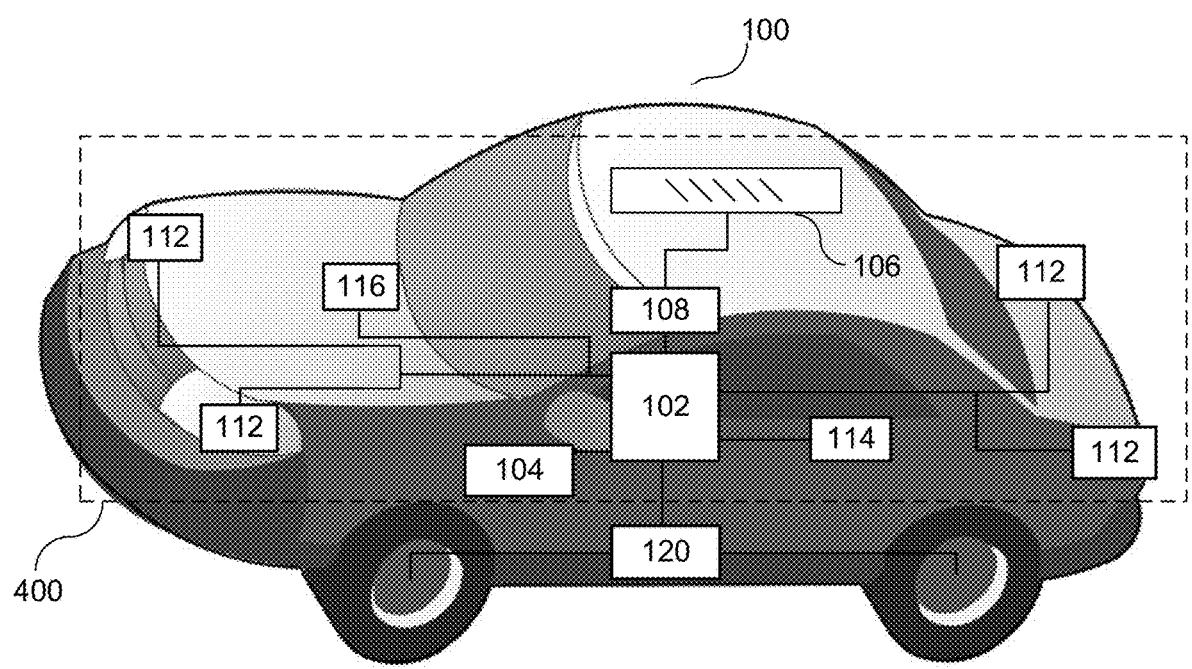
FIG. 1 shows a vehicle including a mobility system and a control system.

The following detailed description refers to the accompanying drawings that show, by way of illustration, exemplary details and aspects in which aspects of the present disclosure may be practiced.

Riding vehicles while performing other in-cabin activities, or disalignment of direction of motion of vehicle and field of view of an occupant of vehicle can cause a mismatch between the visual system and the vestibular system. Such sensory mismatch may lead to motion sickness and discomfort. This may prevent high productivity and focused tasks from being done and may hinder passenger's overall comfort and experience. Additionally, in some cases, motion sickness is known to be caused just by stimuli from vehicle-induced accelerations. In general, vibrations that may be transmitted to seated occupants may be a cause for discomfort and can be negative to the riding experience. Vehicles include cars, buses, vans, trains, motorbikes and bikes, robotaxis, air taxis, robots, assisted as well as autonomous vehicles. Acceleration may be in a certain direction, angular, or a combination of both; in addition, acceleration may be positive or negative (i.e. deceleration, e.g. caused by breaking).

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains fewer elements than the set.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

As used herein, "occupant" is understood as a person who is in a vehicle. An occupant may be a person who is responsible to provide at least one operating function to the vehicle, (e.g. a driver, an operator), or may be a person who is in the vehicle without providing any operating functions to the vehicle (e.g. a passenger). In various aspects, an occupant may be a pet or an animal located in the vehicle.

As used herein, "attribute" is understood as a quality, feature, or characteristic that may be deemed to be ascribed to someone. For example, an attribute of an occupant may include a facial attribute, and/or a finger attribute (e.g. fingerprint), and/or a body attribute (e.g. height, weight, thickness, etc.) specific to at least a portion of a body of the occupant, a movement attribute (e.g. hand gesture, body gesture, body posture, etc.), a behavior attribute (e.g. actions, reactions, etc.), a position attribute (e.g. location) specific to at least a portion of a body of the occupant, and such.

As used herein, "interaction" is understood as a mutual or reciprocal action or influence between entities. For example, an interaction of an occupant with a vehicle may include any type of action that may cause an effect on a component of the vehicle or attached to and/or in relation to the vehicle.

The disclosure may include information related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network," "wireless network", "communication network," or the like, as utilized herein encompasses both an access section of a network (e.g., a radio access network (RAN) section) and a core section of a network (e.g., a core network section).

Figure 2:
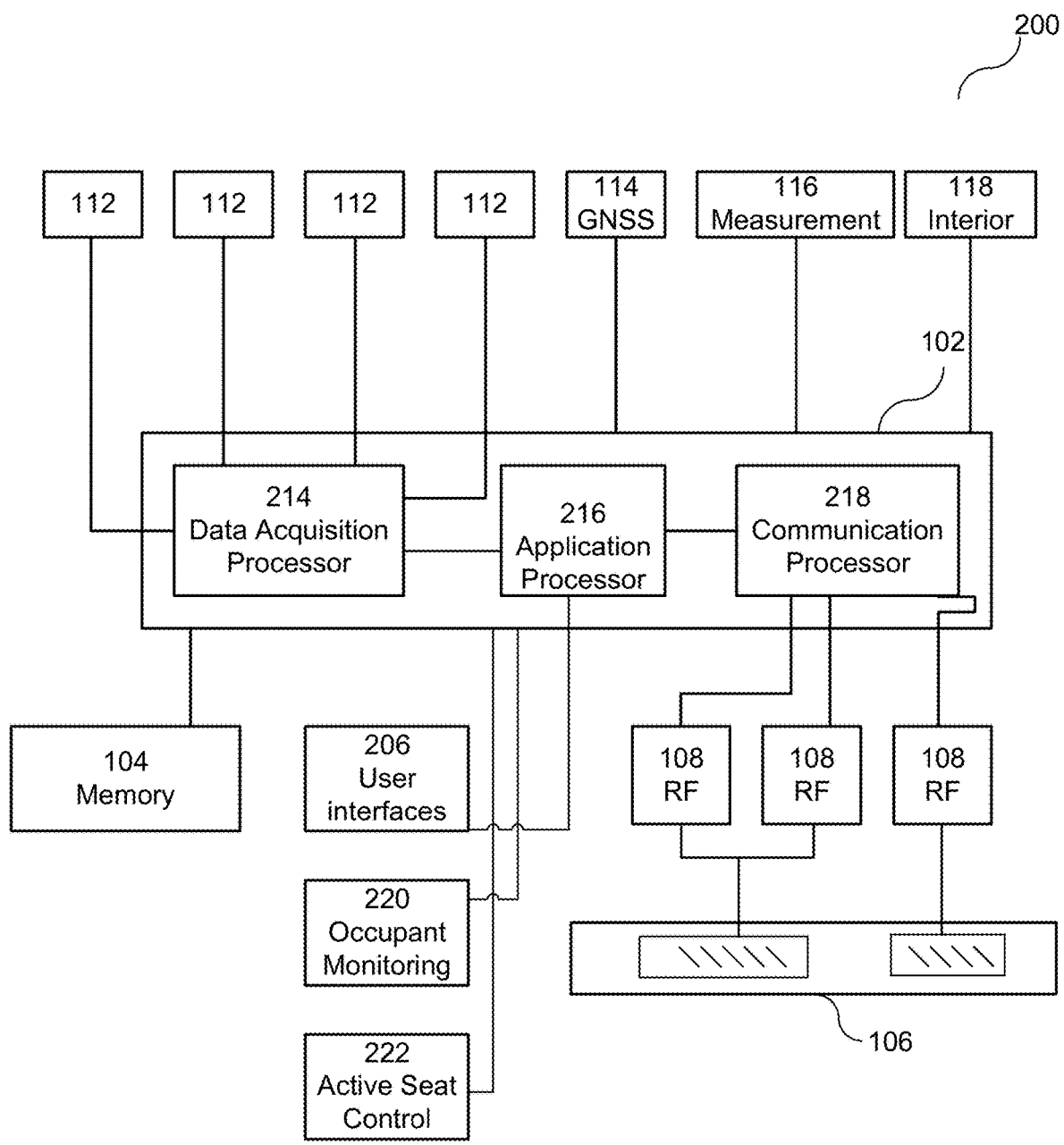
FIG. 2 shows schematically a vehicle including a mobility system and a control system.

FIG. 1 shows a vehicle 100 including a mobility system 120 and a control system 200 (see also FIG. 2). FIG. 1 and FIG. 2 are provided in a complementary manner. It is appreciated that vehicle 100 and control system 200 are exemplary in nature and may thus be simplified for explanatory purposes. For example, while vehicle 100 is depicted as a ground vehicle, this may be equally or analogously applied to aerial vehicles, water vehicles (e.g. sea vehicles, underwater vehicles), and such. Furthermore, the quantities and locations of elements, as well as relational distances (as discussed above, the figures are not to scale) are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels.

In addition to including a control system 200, vehicle 100 may also include a mobility system 120. Mobility system 120 may include components of vehicle 100 related to steering and movement of vehicle 100. Where vehicle 100 is an automobile, for example, mobility system 120 may include wheels and axles, a suspension, an engine, a transmission, brakes, a steering wheel, associated electrical circuitry and wiring, and any other components used in the driving of an automobile. Especially certain components of the mobility system 120 may be a source of vibrations that may be transmitted to the occupant due to the nature of steering and movement of the vehicle. Such vibration sources may include wheels and the engine.

Mobility system 120 may also include autonomous driving functionality, and accordingly may include an interface with one or more processors 102 configured to perform autonomous driving computations and decisions and an array of sensors for movement and obstacle sensing. In this sense, the mobility system 120 may be provided with instructions to direct the navigation and/or mobility of vehicle 100 from one or more components of the control system 200. The autonomous driving components of mobility system 120 may also interface with one or more radio frequency (RF) transceivers 108 to facilitate mobility coordination with other nearby vehicular communication devices and/or central networking components, such as a traffic infrastructure system, or a roadside unit, or a monitoring system.

Furthermore, mobility system 120 may include or coupled to sensors (e.g. as data acquisition devices) that are configured to detect acceleration of the components that may be a source of vibrations. In the example of an automobile, a sensor configured to detect acceleration may be coupled to the engine. There may be further sensors configured to detect acceleration that are coupled to at least one wheel of the vehicle. The sensors may be configured to detect acceleration based on movements of the coupled component relative to the housing or chassis of the vehicle. Such sensors may include inertial measurement unit (IMU) sensors.

The control system 200 may include various components depending on the requirements of a particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data acquisition devices 112, one or more position devices 114 which may include components and circuitry for receiving and determining a position based on a Global Navigation Satellite System (GNSS) and/or a Global Positioning System (GPS), and one or more measurement sensors 116, e.g. speedometer, altimeter, gyroscope, velocity sensors, etc.

Furthermore, the control system 200 may include or may be coupled to interior systems 118 related to various cabin features of the vehicle 100. The interior systems 118 may include an in-vehicle infotainment system, active seat control devices 222, occupant monitoring devices 220, seat actuators to change positions, shape or properties of seats, air conditioner systems, etc. The control system 200 may be configured to control the interior systems 118.

The control system 200 may be configured to control the vehicle's 100 mobility via mobility system 120 and/or interactions with its environment, e.g. communications with other devices or network infrastructure elements (NIEs) such as base stations, via data acquisition devices 112 and the radio frequency communication arrangement including the one or more RF transceivers 108 and antenna system 106.

The one or more processors 102 may include a data acquisition processor 214, an application processor 216, a communication processor 218, and/or any other suitable processing device. Each processor 214, 216, 218 of the one or more processors 102 may include various types of hardware-based processing devices. By way of example, each processor 214, 216, 218 may include a microprocessor, pre-processors (such as an image pre-processor), graphics processors, a CPU, support circuits, digital signal processors, integrated circuits, memory, or any other types of devices suitable for running applications and for image processing and analysis. Each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 may include an internal memory for such storage.

The data acquisition processor 214 may include processing circuitry, such as a CPU, for processing data acquired by data acquisition units 112. For example, if one or more data acquisition units are image acquisition units including sensors e.g. one or more cameras, then the data acquisition processor may include image processors for processing image data using the information obtained from the image acquisition units as an input. The data acquisition processor 214 may therefore be configured to create voxel maps detailing the surrounding of the vehicle 100 based on the data input from the data acquisition units 112, i.e., cameras in this example. For example, the one or more data acquisition units may include sensors, and the data acquisition processor 214 may receive information from the sensors and provide sensor data to the application processor. The sensor data may include information indicating the detections performed by the sensors.

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), a user interfaces (UI) 206 for supporting user interaction with vehicle 100, and/or various user applications. Application processor 216 may interface with communication processor 218 and act as a source (in the transmit path) and a sink (in the receive path) for user data, such as voice data, audio/video/image data, messaging data, application data, basic Internet/web access data, etc. Application processor 216 may interface with the data acquisition processor 214 to receive sensor data.

In the transmit path, communication processor 218 may therefore receive and process outgoing data provided by application processor 216 according to the layer-specific functions of the protocol stack, and provide the resulting data to digital signal processor 208. Communication processor 218 may then perform physical layer processing on the received data to produce digital baseband samples, which digital signal processor may provide to RF transceiver 108. RF transceiver 108 may then process the digital baseband samples to convert the digital baseband samples to analog RF signals, which RF transceiver 108 may wirelessly transmit via antenna system 106.

In the receive path, RF transceiver 108 may receive analog RF signals from antenna system 106 and process the analog RF signals to obtain digital baseband samples. RF transceiver 108 may provide the digital baseband samples to communication processor 218, which may perform physical layer processing on the digital baseband samples. Communication processor 218 may then provide the resulting data to other processors of the one or more processors 102, which may process the resulting data according to the layer-specific functions of the protocol stack and provide the resulting incoming data to application processor 216. Application processor 216 may then handle the incoming data at the application layer, which can include execution of one or more application programs with the data and/or presentation of the data to a user via a user interface 206. User interfaces 206 may include one or more screens, microphones, mice, touchpads, keyboards, or any other interface providing a mechanism for user input.

Vehicle 100 may transmit and receive wireless signals with antenna system 106, which may be a single antenna or an antenna array that includes multiple antenna elements. Antenna system 202 may additionally include analog antenna combination and/or beamforming circuitry. In the receive (RX) path, RF transceiver(s) 108 may receive analog radio frequency signals from antenna system 106 and perform analog and digital RF front-end processing on the analog radio frequency signals to produce digital baseband samples (e.g., In-Phase/Quadrature (IQ) samples) to provide to communication processor 218. RF transceiver(s) 108 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 108 may utilize to convert the received radio frequency signals to digital baseband samples. In the transmit (TX) path, RF transceiver(s) 108 may receive digital baseband samples from communication processor 218 and perform analog and digital RF front-end processing on the digital baseband samples to produce analog radio frequency signals to provide to antenna system 106 for wireless transmission. RF transceiver(s) 108 may thus include analog and digital transmission components including amplifiers (e.g., Power Amplifiers (PAs), filters, RF modulators (e.g., RF IQ modulators), and digital-to-analog converters (DACs), which RF transceiver(s) 108 may utilize to mix the digital baseband samples received from communication processor 218 and produce the analog radio frequency signals for wireless transmission by antenna system 106. Communication processor 218 may control the radio transmission and reception of RF transceiver(s) 108, including specifying the transmit and receive radio frequencies for operation of RF transceiver(s) 108.

Communication processor 218 may include a baseband modem configured to perform physical layer (PHY, Layer 1) transmission and reception processing to, in the transmit path, prepare outgoing transmit data provided by communication processor 218 for transmission via RF transceiver(s) 108, and, in the receive path, prepare incoming received data provided by RF transceiver(s) 108 for processing by communication processor 218. The baseband modem may include a digital signal processor and/or a controller. The digital signal processor may be configured to perform one or more of error detection, forward error correction encoding/decoding, channel coding, and interleaving, channel modulation/demodulation, physical channel mapping, radio measurement and search, frequency and time synchronization, antenna diversity processing, power control, and weighting, rate matching/de-matching, retransmission processing, interference cancelation, and any other physical layer processing functions.

RF transceiver(s) 108 may include separate RF circuitry sections dedicated to different respective radio communication technologies, and/or RF circuitry sections shared between multiple radio communication technologies. Antenna system 106 may include separate antennas dedicated to different respective radio communication technologies, and/or antennas shared between multiple radio communication technologies. Accordingly, antenna system 106, RF transceiver(s) 108, and communication processor 218 can encompass separate and/or shared components dedicated to multiple radio communication technologies.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Memory 104 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

The antenna system 106 may include a single antenna or multiple antennas. Each of the one or more antennas of antenna system 106 may be placed at a plurality of locations on the vehicle 100 in order to ensure maximum RF coverage. The antennas may include a phased antenna array, a switch-beam antenna array with multiple antenna elements, etc. Antenna system 106 may be configured to operate according to analog and/or digital beamforming schemes in order to maximize signal gains and/or provide levels of information privacy. Antenna system 106 may include separate antennas dedicated to different respective radio communication technologies, and/or antennas shared between multiple radio communication technologies.

While shown as a single element in FIG. 1, antenna system 106 may include a plurality of antenna elements (e.g., multiple antenna arrays) positioned at different locations on vehicle 100. The placement of the plurality of antenna elements may be strategically chosen in order to ensure a desired degree of RF coverage. For example, additional antennas may be placed at the front, back, corner(s), and/or on the side(s) of the vehicle 100.

Data acquisition devices 112 may include any number of data acquisition devices and components, including sensors, depending on the requirements of a particular application. This may include image acquisition devices, proximity detectors, acoustic sensors, pressure sensors, fingerprint sensors, motion detectors, etc., for providing data about the interior of the vehicle or the vehicle's environment. Image acquisition devices may include cameras (e.g., multimodal cameras, standard cameras, digital cameras, video cameras, single-lens reflex cameras, infrared cameras, stereo cameras, depth cameras, RGB cameras, depth cameras, etc.), charge coupling devices (CCDs), or any type of image sensor. Proximity detectors may include radar sensors, light detection and ranging (LIDAR) sensors, mmWave radar sensors, etc. Acoustic sensors may include microphones, sonar sensors, ultrasonic sensors, etc. Furthermore, the data acquisition devices may include the sensors coupled to the mobility system 120, such as the accelerometers, inertial measurement unit (IMU) sensors coupled to vibration sources of the vehicle.

The data acquisition devices 112 may be configured depending on the requirements of a particular application. This may include: image acquisition devices configured to detect a facial attribute of an occupant, image acquisition devices configured to detect at least one portion of a body of an occupant, image acquisition devices configured to detect a hand of an occupant, pressure sensors may be configured to detect a pressure applied by at least one portion of a body of an occupant, pressure sensors may be configured to detect a pressure applied by a hand of an occupant, fingerprint sensors may be configured to detect a fingerprint of an occupant, etc.

Accordingly, each of the data acquisition units may be configured to observe a particular type of data of an occupant of the vehicle 100 or the vehicle's 100 environment and forward the data to the data acquisition processor 214 in order to provide the vehicle with an accurate portrayal of the interior of the vehicle 100 or vehicle's 100 environment. The data acquisition devices 112 may be configured to implement pre-processed sensor data, such as radar target lists or LIDAR target lists, in conjunction with acquired data.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, etc. It is appreciated that vehicle 100 may have different measurement devices 116 depending on the type of vehicle it is, e.g., car vs. drone vs. boat.

Position devices 114 may include components for determining a position of the vehicle 100. For example, this may include GPS or other GNSS circuitry configured to receive signals from a satellite system and determine a position of the vehicle 100. Position devices 114, accordingly, may provide vehicle 100 with satellite navigation features. The one or more position devices 114 may include components (e.g., hardware and/or software) for determining the position of vehicle 100 by other means, e.g. by using triangulation and/or proximity to other devices such as NIEs.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (sensor data including information such as images, sensor readings, radar signals, depth information from LIDAR, or stereo processing of two or more images) of the environment of the vehicle 100 together with position information, such as GPS coordinates, a vehicle's ego-motion, etc., to determine a current location of the vehicle 100 relative to the known landmarks, and refine the determination of the vehicle's location. Certain aspects of this technology may be included in a localization technology such as a mapping and routing model.

Furthermore, the one or more memories 104 may store data, e.g., in a database or in any different format, including occupant information 204 that may correspond to information related to one or more occupants. The data may include information related to the identification of one or more occupants. The data may include face recognition data, fingerprint data, body data/body posture data, behavior data, hand position data, hand posture data, hand gesture data, movement data, action data. The data may further include one or more parameters or settings that are predefined and/or predetermined for one or more occupants, in order to adjust one or more settings related to the vehicle 100.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the control system 200 as also described with reference to FIG. 2. The vehicle 100 may include the one or more processors 102 integrated with or separate from an engine control unit (ECU) which may be included in the mobility system 120 of the vehicle 100. The control system 200 may, in general, generate data to control or assist to control the ECU and/or other components of the vehicle 100 to directly or indirectly control the movement of the vehicle 100 via mobility system 120. The one or more processors 102 of the vehicle 100 may be configured to perform as described herein.

The components illustrated in FIGS. 1 and 2 may be operatively connected to one another via any appropriate interfaces. Furthermore, it is appreciated that not all the connections between the components are explicitly shown, and other interfaces between components may be covered within the scope of this disclosure. Furthermore, the control system 200 may further include a device 220 for monitoring an occupant in accordance with this disclosure. The control system 200 may further include a device 222 for controlling an active seat in accordance with this disclosure.

In a road environment, it may be desirable for a vehicle 100 to communicate with other entities in order to enhance the road safety and provide more efficient traffic situation within the road environment. Developing communication protocols, such as V2V (vehicle-to-vehicle) in which a vehicle communicates with another vehicle, V2I (vehicle-to-infrastructure), in which a vehicle communicates with an infrastructure item, such as a traffic infrastructure system or a roadside unit, V2N (vehicle-to-network) in which a vehicle communicates with a network function, V2P (vehicle-to-pedestrian) in which a vehicle communicates with a pedestrian are adopted for this purpose, which are combined together as V2X (vehicle-to-everything). Some of these protocols rely on vehicles broadcasting messages to communicate with other entities in a predefined proximity (e.g. V2V), while others rely on a communication through an established network (e.g. V2N).

V2X messages shared using V2X protocols may include various data items that may be in a form of data elements or data frames indicating information including any type of traffic related information under various categories. Such categories may include vehicle information indicating a feature of a vehicle such as driving direction, information relating acceleration/deacceleration of a vehicle etc., geo-reference information indicating a geographical description e.g. altitude, longitude, latitude related information, road topology information indicating information related to road topology such as road segment type, traffic information indicating traffic related information such as a presence of accident, presence of dangerous situation, infrastructure information indicating information about the infrastructure, such as a presence of a toll or a road side unit, personal information indicating a personal information, communication information that are related to the application layer of the communication protocol, such as an identifier of a station exchanging information, and other information such as type of a station which exchanges information.

Accordingly, the vehicle 100 may generate information based on the vehicle 100, and the vehicle 100 may encode V2X messages for transmission. V2X messages may include information indicating an observation that the vehicle 100 performs using data acquisition devices 112. For example, V2X messages may include information indicating a list of objects that the vehicle 100 has detected in its vicinity using data acquisition devices 112. The vehicle 100 may transmit the list of objects for other vehicles to make other vehicles aware of the objects that the vehicle 100 has detected using data acquisition devices 112.

Figure 3:
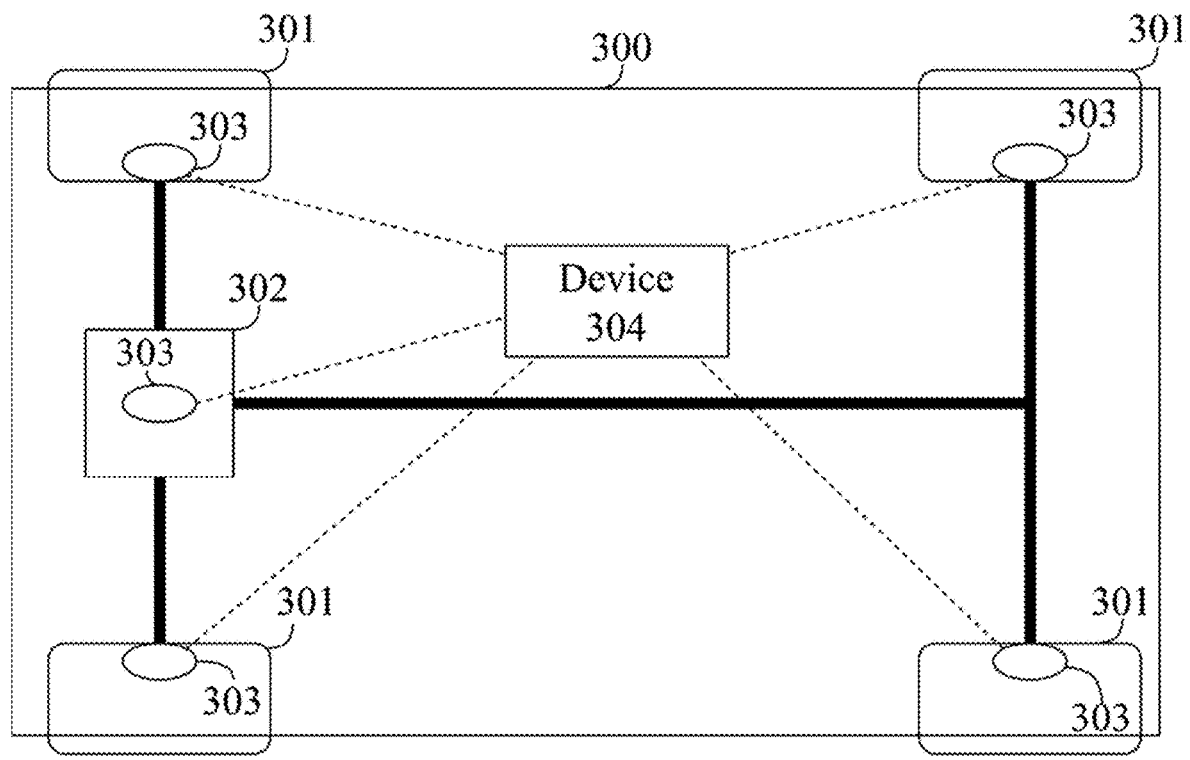
FIG. 3 shows an illustration of certain components of a mobility system of a vehicle.

FIG. 3 shows an illustration of certain components of a mobility system of a vehicle. The vehicle 300 is depicted as an automobile. The vehicle 300 may include four wheels 301 and an engine 302. The vehicle 300 may further include sensors 303 to detect acceleration (i.e. acceleration sensor). The sensors 303 may include inertial measurement units (IMU). As certain components of the mobility system such as the wheels 301 and the engine 302 may be considered as vibration sources, the sensors 303 are configured to detect acceleration of each of these vibration sources, namely each of the wheels 301 and the engine 302. The vibration sources include, in particular, components or parts that are prone to vibration due to interactions of the vehicle 300 with a medium that the vehicle 300 moves through or with (e.g. a road for an automobile).

The sensors 303, as data acquisition devices, may provide the sensor data to a device 304 for controlling an active seat of the vehicle 300. The sensor data may include an acceleration of the corresponding component in at least one direction. The sensor data may include information indicating the movement of the corresponding component in a translational envelope including an x-axis, a y-axis, and a z-axis and a rotational envelope including a rotation around the x-axis, a rotation around the y-axis, and a rotation around the z-axis. Furthermore, the sensor data may include time information indicating the time of the detection of the corresponding acceleration.

The sensors 303 may be communicatively coupled to the device 304. The sensors 303 may be communicatively coupled to another entity of the vehicle 300, and the device 304 may be configured to access the sensor data which the sensors 303 provide. The device 304 may be configured to receive the sensor data over a communication network. The device 304 for controlling an active seat of the vehicle 300 may be a component of the control system of the vehicle 300. For example, the processing functions of the device 304 may be provided by an application processor of the control system.

Figure 4:
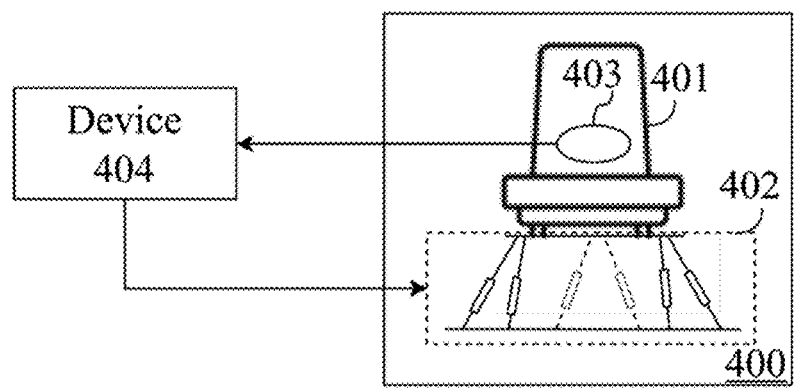
FIG. 4 shows an illustration including an active seat and a device for controlling an active seat.

FIG. 4 shows an illustration including an active seat and a device for controlling an active seat. The active seat 400 may include any type of seating that is configured to move at least along one direction. In the example of an active seat in a vehicle, the active seat 400 may move at least in one direction relative to the chassis or housing of the vehicle. This may also be expressed as that the active seat 400 may move at least in one direction relative to the movement of the vehicle. The active seat 400 includes a seating 401 for an occupant to be seated. In this example, the active seat 400 is depicted as it includes a platform 402 that is configured to provide a movement to the seating 401.

The platform 402 that is configured to provide a movement of the seating 401 may include a Stewart platform (i.e. Gough-Stewart platform). The platform 402 may also be referred to as a motion base. It may include a type of parallel manipulator including six actuators (prismatic actuators e.g. hydraulic jacks or linear actuators). There are coupled to a baseplate and a top plate via joints. The top plate is attached to the seating 401 and the platform 402 is configured to provide a movement within six degrees of freedom. The movement within six degrees of freedom includes a translational envelope including an x-axis, a y-axis, and a z-axis (lateral, longitudinal, vertical), and a rotational envelope including a rotation around each of the axes (pitch, roll, yaw).

The active seat 400 may further include an acceleration sensor 403. The acceleration sensor 403 may be configured to detect an acceleration of the seating 401. The acceleration sensor 403 may be configured to detect the acceleration of the seating 401 based on the movement of the seating 401 relative to the chassis or housing of the vehicle that the active seat 400 is attached to. The acceleration sensor 403 may be configured to detect the acceleration of the seating 401 based on movement relative to the baseplate of the platform 402 of the active seat 400. The acceleration sensor 403 may include an inertial measurement unit (IMU) sensor.

The acceleration sensor 403 may provide sensor data indicating detection of the acceleration of the active seat 400. The sensor data may include information indicating an acceleration of the active seat 400 in a translational envelope including an x-axis, a y-axis, and a z-axis and a rotational envelope including a rotation around the x-axis, a rotation around the y-axis, and a rotation around the z-axis. Furthermore, the sensor data may include time information indicating the time of the detection of the corresponding acceleration.

A device 404 for controlling the active seat 400 may be coupled to the acceleration sensor 403 to receive the sensor data. The acceleration sensor 403 may provide the sensor data to another component of the vehicle and the device 404 may be configured to access the sensor data provided by the acceleration sensor 403. The device 404 may be configured to receive the sensor data over a communication network.

The device 404 may be configured to generate a control signal to control the movement of the active seat 400. The device 404 may be coupled to the active seat 400. The device 404 may be coupled to the platform 402 of the active seat to control the platform 402. The active seat 400 may include a controller (not shown) and the device 404 may be coupled to the controller and provide the control signal. The device 404 may be configured to provide the control signal over a communication network. The control may include an actuation (e.g an actuation of a spatial movement of the active seat and/or an angular movement of the active seat and/or a spatial movement of a part of the active seat, and/or an angular movement of a part of the active seat, and/or a change of a shape of the active seat, and/or a change of at least one property of the active seat.) of the active seat.

The control signal may include information indicating a movement of the active seat 400 at least in one direction. The control signal may include information indicating the movement of the active seat 400 in a translational envelope including an x-axis, a y-axis, and a z-axis and a rotational envelope including a rotation around the x-axis, a rotation around the y-axis, and a rotation around the z-axis. The platform 402 of the active seat is configured to move the seat with desired accelerations indicated by the control signal.

In a normal driving environment, a typical acceleration that an occupant (e.g. human) may perform ranges from (0.3, 0.9) m/s2 for a lateral acceleration, and (−2, 1.5) m/s2 for a longitudinal acceleration, and (0.1, 0.9) m/s2 for a vertical acceleration. Such accelerations, in general, may not change abruptly and are mostly as responses to driving functions which may be provided to the vehicle using control commands on the steering wheel, brake, and throttle. For example, it may be desirable to counter low frequency components of accelerations by tilting the seating 401 and using gravity as the opposing force to counter accelerations that span more than at least one fraction of a second.

Furthermore, there may be accelerations that may be caused by the interaction of the vehicle with paved roads. Such accelerations may be, in general, in the range of (0.1-1.0) m/s2. Furthermore, the vehicle may experience peak values of 3 m/s2 in the vertical direction. Such peak values may be caused according to road environment, e.g. by potholes, debris, and unpaved roads. The peak values may change fast, however human tactile afferents and haptic feedback capabilities may not able to detect signals over 400 Hz. Accordingly, it may be desirable to compensate for vibrations in the 0-400 Hz frequency range.

Additionally, it may be desirable to attenuate the magnitude of such accelerations below a predefined threshold (e.g. human sensitivity threshold as disclosed herein). Accordingly, it may be desirable to configure the actuators of the active seat 400 fast enough that may respond to the changes. It may further be desirable to employ sensors in accordance with various aspects of this disclosure to perform detection with a sample rate that is approximately at 800 Hz or higher, and configured the actuators of the active seat 400 accordingly to provide a desirable frequency response.

In certain cases of low frequency components with respect to accelerations that may be generated by maneuvers of the vehicle such as coming to a full stop at a traffic light or performing a right turn, and with an assumption of a normal driving style which may produce peak accelerations of 2 m/s2, a body mass of 136 kg (97% US male percentile), and a seat of 30 Kg, it may be desired for the platform including all actuators to provide 332 watts of power. In this example of the platform 402 including 6 actuators, it may be desired for each of the actuators to deliver around at least 50 Watts of power, in particular at least 55 Watts of power. Furthermore, there may be further motions that may demand more power from some motors than others, and for these cases, it may be desired for each of the actuators to deliver around at least 100 Watts of power, in particular at least 110 Watts of power.

The platform 402 of the active seat 400 may provide the movement with the actuators. It may be necessary for each of these actuators to deliver substantially to provide the movement in order to provide countermovement for accelerations that the seating 401 may experience due to common vibrations. Preferably, the actuators may be able to provide around 100 Watts of power, in particular at least 110 Watts of power to provide countermovement for accelerations that the seating 401 may experience many vibrations that the seating 401 may experience. Furthermore, the active seat 400 may include further actuation elements (e.g. actuators) that may be configured to adjust the position of the active seat 400 (e.g. adjusting the position of the seating 401), and/or adjust the shape of the seating 401, and/or adjust other properties of the active seat 400. The active seat 400 may provide a movement via one or a combination of the actuators.

Figure 5:
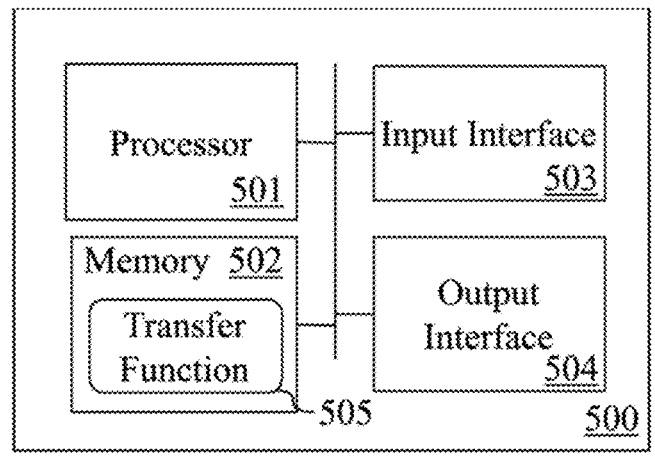
FIG. 5 shows schematically an example of a device for controlling an active seat of a vehicle.

FIG. 5 shows schematically an example of a device for controlling an active seat of a vehicle. The device 500 may be coupled to sensors that are configured to detect acceleration of the vibration sources such as the wheels and the engine of the vehicle as exemplarily shown in FIG. 3. The device 500 may further be coupled to a sensor that is configured to detect acceleration of the active seat as exemplarily shown in FIG. 4.

The device 500 may include a processor 501, a memory 502, an input interface 503 to receive data, and an output interface 504 to provide data. The input interface 503 may be configured to receive sensor data including information indicating detection of acceleration (i.e. acceleration information) of at least one vibration source. The sensor data may include information indicating a detection of acceleration of at least a wheel of the vehicle and/or detection of acceleration of at least an engine of the vehicle. Acceleration may be positive or negative. The input interface 503 may be coupled to respective sensors (acceleration sensors for wheels and engine) to receive the sensor data. The input interface 503 may be coupled to another entity to receive the sensor data from the respective sensors, and/or the input interface 503 may be configured to receive the sensor data over a communication network.

The sensor data which the input interface 503 receives may include acceleration information of a plurality of vibration sources. The sensor data may include acceleration information for each of the wheels of the vehicle and for the engine of the vehicle, but also any other part of the vehicle. Furthermore, the sensor data may include time information indicating the time of the detection of the corresponding acceleration. Furthermore, the processor 501 may be configured to receive the acceleration information for each of the plurality of vibration sources, and the processor 501 may be configured to combine the acceleration information for each of the plurality of vibration sources in order to obtain the sensor data, as in a first sensor data.

Furthermore, the input interface 503 may be configured to receive driving-related information from another entity of the vehicle. The driving-related information may include any information indicating driving conditions of the vehicle. In particular the driving-related information may include information related to movement of the vehicle (vehicle movement related information), such as throttle information indicating an amount of throttle at various levels (e.g. the amount of power transferred to the engine) for an instance of time, brake information indicating an amount of braking power that the vehicle experiences for an instance of time, an angle of the steering wheel of the vehicle, and such information that relates to the movement of the vehicle during driving.

The input interface 503 may be coupled to other data acquisition devices or measurement devices of the vehicle to receive driving-related information. The input interface 503 may be coupled to an electronic control unit (ECU) of the vehicle to receive driving-related information. The input interface 503 may be coupled to an interface of another entity (e.g. an advanced driver-assistance system, ADAS) to receive driving-related information. Accordingly, the processor 501 may further be configured to combine the acceleration information for each of the plurality of vibration sensors and the driving-related information to obtain the first sensor data. Assisted or autonomous vehicles may also supply planned driving-related information, e.g. planned breaking force if safe distance can not be maintained, planned trajectory, planned acceleration and deceleration actions and forces.

The memory 502 of the device 500 may include a transfer function 505. The transfer function 505 may be configured for a prediction that the processor 501 may perform to predict an acceleration (or deceleration) for an active seat of the vehicle. The transfer function 505 may be configured to obtain an output indicating a prediction of acceleration for an active seat of the vehicle for at least an instance of time based on input data including at least one acceleration information for a vibration source of the vehicle. The input data may further include acceleration information for a period of time.

Accordingly, the processor 501 may be configured to perform a prediction function to predict an acceleration that will be experienced by the active seat based on the first sensor data including acceleration information received from vibration sources such as wheels and the engine of the vehicle. The processor 501 may be configured to predict an acceleration of the active seat based on the first sensor data and the transfer function 505 stored in the memory 502.

Furthermore, based on the prediction for the acceleration that will be experienced by the active seat for at least at a first time instance, the processor 501 may be configured to perform a controlling function to generate a control signal to control the movement or actuation of the active seat e.g. controlling position, shape or other properties of the active seat at the first time instance with a purpose to dampen or cancel the predicted acceleration (e.g. vibrations at various directions) for the active seat at the first time instance by providing movement to counter the predicted acceleration.

Accordingly, the output interface 504 may be configured to provide the control signal as output information. The output signal may include information indicating control of a movement of the active seat at an instance of time (e.g. at the first instance of time). The output signal may include information indicating the first instance of time. The information indicating the first instance of time may be a relative time information (e.g. relative to previous control signal with time units) or an absolute time information indicating the time of the first instance of time in which the movement is to be scheduled.

The output signal may include information indicating the movement (e.g. amount of movement) for at least one direction. The output signal may include information indicating a movement of a translational envelope including an x-axis, a y-axis, and a z-axis and a rotational envelope including a rotation around the x-axis, a rotation around the y-axis, and a rotation around the z-axis.

The output signal may include information indicating distance information (amount of movement) for each of the axes in which the corresponding active seat is to be moved. The output signal may include acceleration information indicating an acceleration for each of the axes in which the corresponding active seat is to be moved. The output signal may include acceleration information and/or distance information (collectively "movement information") for a plurality of time intervals within the first instance of time. Accordingly, the output signal may include movement information for each of the axes for a plurality of time intervals. The output signal may include at least one time interval information for each of the time intervals (e.g. interval beginning time, period information etc.).

The output interface 504 may be configured to provide the output signal to the corresponding active seat. The output interface 504 may provide the output signal to a controller of the active seat (e.g. via an interface of the active seat), and the controller of the active seat may control the actuators of the active seat in order to provide movement to the seating based on the information provided with the output signal. The output interface 504 may be configured to provide the output signal to another entity of the vehicle, and the another entity of the vehicle may provide instructions to move the active seat based on the information which the output signal provides. The output interface 504 may be coupled to the control system of the vehicle.

Furthermore, there may be non-linear, non-stationary transfer functions from the vehicle chassis and spring dampers that may be considered for and other sources of vibrations (air, etc.) that may provide further challenges with respect to a predicted acceleration. Besides, the actuation capabilities may not be provided as desired. Accordingly, the device 500 may further be configured to apply feedback based on a second sensor data including acceleration information of the active seat. The input interface 503 of the device 500 may be configured to receive the second sensor data in a similar manner to the first sensor data.

The processor 501 may be configured to access the second sensor data and initiate a feedback function. The processor 501 may be configured to adjust the transfer function 505 stored in the memory 502 based on the information indicating a detected acceleration of the active seat at the first instance of time in which the active seat has been moved based on the control signal that the processor 501 had generated according to the predicted acceleration of the active seat at the first instance of time. Accordingly, the processor 501 may adjust the transfer function 505 for a next prediction based on the acceleration of the active seat at the instance of time.

In addition, a sensor system may observe occupant posture in the active seat, e.g. occupant sitting straight, touching backrest, leaning forward or to a side, twisted towards other occupants, arms on armrests etc., or determining direction of gaze or field of view of occupant, or a combination of both. It should be appreciated by the skilled person that the device 500 may perform further functions including predictions to generate a control signal to move or actuate the active seat for further instances of time and to adjust the transfer function based on sensor data relating to the further instances of time in a similar manner.

Figure 6:
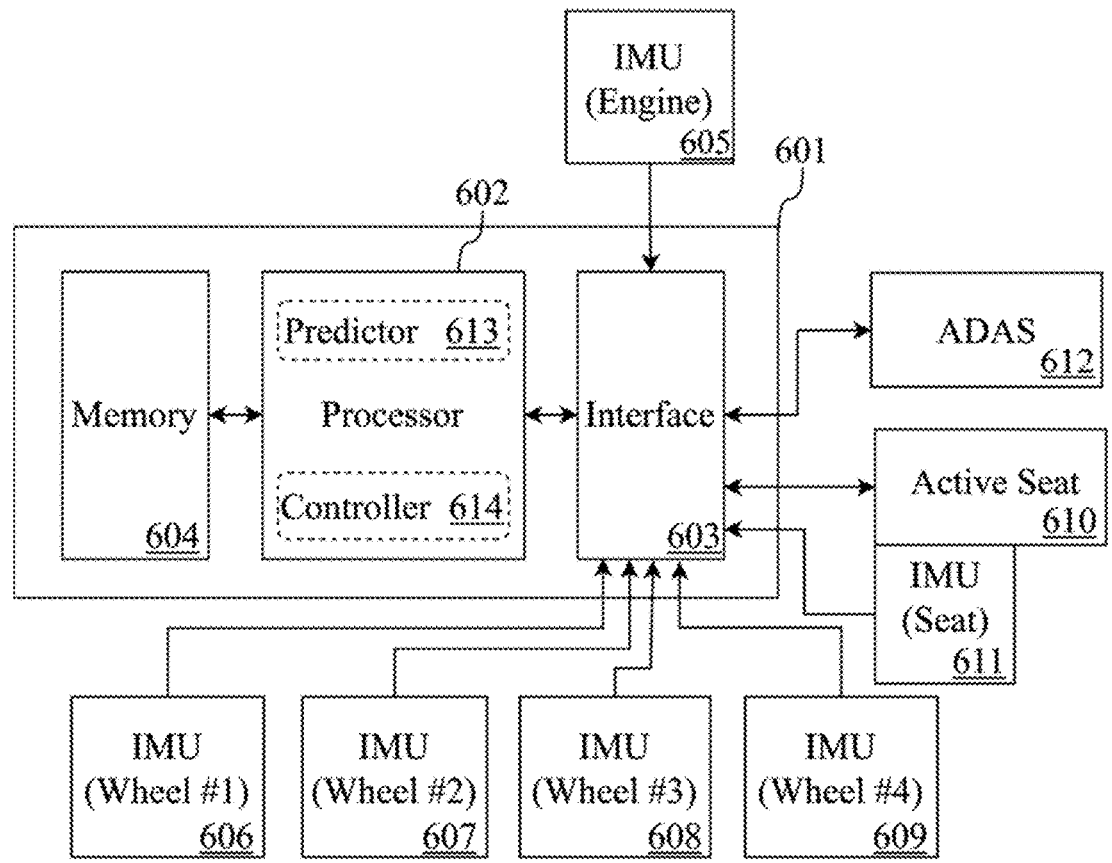
FIG. 6 shows schematically an illustration including a device for controlling an active seat of a vehicle.

FIG. 6 shows schematically an illustration including a device for controlling an active seat of a vehicle. The illustration may be provided as an example of an active seat system including the device 601. A control system of the vehicle may include the device 601. The vehicle includes four wheels and an engine in this example. The device 601 for controlling an active seat may include any aspects provided for the corresponding device as mentioned in FIG. 5.

The device 601 may include a processor 602, an interface 603 to provide communication with input devices and output devices, and a memory 604. The interface 602 may be coupled to a plurality of inertial measurement unit (IMU) sensors 605, 606, 607, 608, 609 that are configured to provide acceleration information for the wheels and the engine of the vehicle. Furthermore, the interface 602 may be coupled to an inertial measurement unit (IMU) sensor 611 that is configured to provide acceleration information for the active seat 610 to be controlled. The interface 602 may be further coupled to the active seat 610 at least to provide a control signal. Furthermore, the interface 602 may be coupled to an advanced driver-assistance system (ADAS) 612 of the vehicle.

The processor 602 may include a predictor 613 block that is configured to perform the prediction function and a controller 614 block that is configured to perform the controlling function. These blocks are depicted only for illustration purposes and their functions may be performed by any functioning unit or a combination of functioning units of the processor 602 (e.g. a central processing unit, a hardware acceleration unit, a neural network processing unit, etc.).

The processor 602 may be configured to receive sensor data which the plurality of inertial measurement unit (IMU) sensors 605, 606, 607, 608, 609 are configured to provide. The sensor data may include acceleration information for the wheels and the engine of the vehicle. The processor 602 may be configured to receive driving-related information indicating information related to the movement of the vehicle (e.g. throttle information, brake information, angle of the steering wheel) from the advanced driver-assistance system (ADAS) 612. The processor 602 may be configured to receive seat sensor data which the inertial measurement unit (IMU) sensor 611 is configured to provide. The seat sensor data may include acceleration information for the active seat 610.

The predictor 613 access the sensor data, the driving-related information, and the seat sensor data. The predictor 613 may predict an acceleration of the active seat of the vehicle based on at least the sensor data. The predictor 613 may predict the acceleration of the active seat of the vehicle based on the sensor data and the driving-related information. The predictor 613 may predict the acceleration of the active seat based on the sensor data, the driving-related information, and the seat sensor data. The predictor 613 may predict the acceleration of the active seat at least for a first instance of time.

The predictor 613 may obtain input data by synchronizing the information which the predictor 613 is going to use to predict the acceleration of the active seat. In this example, the predictor 613 may obtain the input data by synchronizing the sensor data and the driving-related information, such that the input data may include information relating to a specified instance of time. Accordingly, the predictor 613 may perform the prediction for a future instance of time based on the input data including the sensor data and the driving-related information relating to an instance of time. The input data may include the acceleration information for the vibration sources and the driving-related information that are synchronized for a plurality of instances of time as provided above.

The sensor data may include six data items for each of the sensors, which each of the data items represents a detected acceleration with the corresponding sensor for a corresponding axis, such as of a translational envelope including an x-axis ($\ddot{x}$), a y-axis ($\ddot{y}$), and a z-axis ($\ddot{z}$) and a rotational envelope including a rotation around the x-axis ($\dot{\alpha}$), a rotation around the y-axis ($\dot{\beta}$), and a rotation around the z-axis ($\dot{\gamma}$). In other words, each corresponding sensor may provide information indicating a detected acceleration with the following notation: $\ddot{X}_n = (\ddot{x}, \ddot{y}, \ddot{z}, \dot{\alpha}, \dot{\beta}, \dot{\gamma})_n$.

Furthermore, as mentioned above, the first sensor data may further include the driving-related information. The data items of the driving-related information may be represented as they include steering wheel angle ($u_w$), throttle ($u_a$), and brake ($u_b$). Accordingly, for the first sensor data that may include data items for an instance of time, the predictor 613 may provide an output $f_\Theta$ ($\ddot{X}_{0:4}$, $u_w$, $u_a$, $u_b$)=$\ddot{X}_p\ddot{X}_p$ represents the predicted acceleration of the active seat and $f_\Theta$ represents the transfer function to obtain the predicted acceleration based on the first sensor data. The processor 602 may use the predicted acceleration $\ddot{X}_p$ as part of a feedforward control with a desire to minimize the acceleration perceived by the occupant (acceleration of the active seat) by actively countering the predicted acceleration. It may be desired to learn the transfer function in a self-supervised manner.

The predictor 613 may be configured to execute a neural network to perform the prediction of the acceleration of the active seat. The neural network may include a convolutional neural network. The output of the neural network may include a predicted acceleration of the active seat for an instance of time. The neural network may include an input layer, an output layer, and at least one layer (e.g. hidden layer(s)) between the input layer and the output layer. The neural network may be configured to perform calculations to provide the output from its output layer according to a plurality of model parameters in the memory 604. The model parameters may include a weight or a bias related to a neuron or a layer of the neural network according to a predetermined neural network model.

The neural network model may include a training stage and an inference stage. During the training stage, the neural network model may receive the sensor data including the acceleration information of the defined vibration sources and the driving-related information for a plurality of samples. During the training stage, the neural network may adjust the model parameters in the memory 604 according to the predicted accelerations.

For example, the training stage may initially be configured according to measurements taken while a plurality of drivers driving the vehicle in various road environments. Based on the taken measurements while the plurality of drivers is driving the vehicle in various road environments, the model parameters may be adjusted based on the predicted acceleration of the predictor 613 for the instance of time, and the second sensor data which the inertial measurement unit (IMU) sensor 611 of the active seat 610 provides for that instance of time.

The neural network model may include a predefined cost function to adjust the model parameters. The predefined cost function may be configured to penalize a difference between the predicted acceleration for the instance of time and a detected acceleration for the instance of time. The neural network model may be configured to adjust the model parameters (e.g. neural network weights) based on the predefined cost function that is configured to penalize the difference between the predicted acceleration and the detected acceleration.

The predefined cost functions may be configured to include a predefined threshold that is configured to represent a human sensitivity threshold. The human sensitivity threshold may be defined as approximately 0.1 m/s2 for each of the axes of a movement. Accordingly, the predefined threshold may be represented as $\vec{\omega}=[0.1, 0.1, 0.1, 0.1, 0.1, 0.1]$ at six axes of movement.

Therefore, the neural network model may include the predefined cost function that is configured to encourage predictions that are within the limits of the predefined threshold. For example, the predefined cost function may include $J(\theta)=|\ddot{X}s-\ddot{X}p|_2^2+\||\ddot{X}s-\ddot{X}p|-\vec{\omega}|_2^2$, where $\ddot{X}s$ may include information provided by the inertial measurement unit (IMU) sensor 611 of the active seat 610. The neural network model may accordingly adjust the model parameters in the memory 604 based on the predefined cost function, since the transfer function that will be applied by the neural network may be changed over time due to various vibration patterns according to the road environment at the training stage.

In other words, the neural network model may be configured to calculate a plurality of states, in which each of the plurality of states may be represented as a set of model parameters (e.g. weight, bias) and may be configured to provide a candidate predicted acceleration as an output which the neural network model may use to calculate the costs for each of the plurality of states according to the cost function.

Based on the calculation of the costs for each of the plurality of states of the neural network model, the neural network model may adjust the model parameters to minimize the cost function. The neural network model may select one state from the plurality of states, which the selected state has the least cost among the calculated costs, and adjust the model parameters based on model parameters of the selected state.

At the inference stage, the predictor 613 may provide the sensor data including the acceleration information of the vibration sources to the neural network configured to predict the acceleration of the active seat based on the model parameters in the memory 604 and provide the acceleration of the active seat as an output. The inference stage may provide the predicted acceleration of the active seat to the training stage as well, such that the predictor 613 may adjust the model parameters in the memory 604 based on the neural network model (i.e. the predefined cost function) according to the second sensor data which the inertial measurement unit (IMU) sensor 611 of the active seat 610 provides for that instance of time. In other words, with each iteration of the inference stage, the training stage may use the predicted acceleration for the first instance of time and the detected acceleration received from the second sensor data for the first instance of time to adjust the model parameters as defined above.

Figure 7:
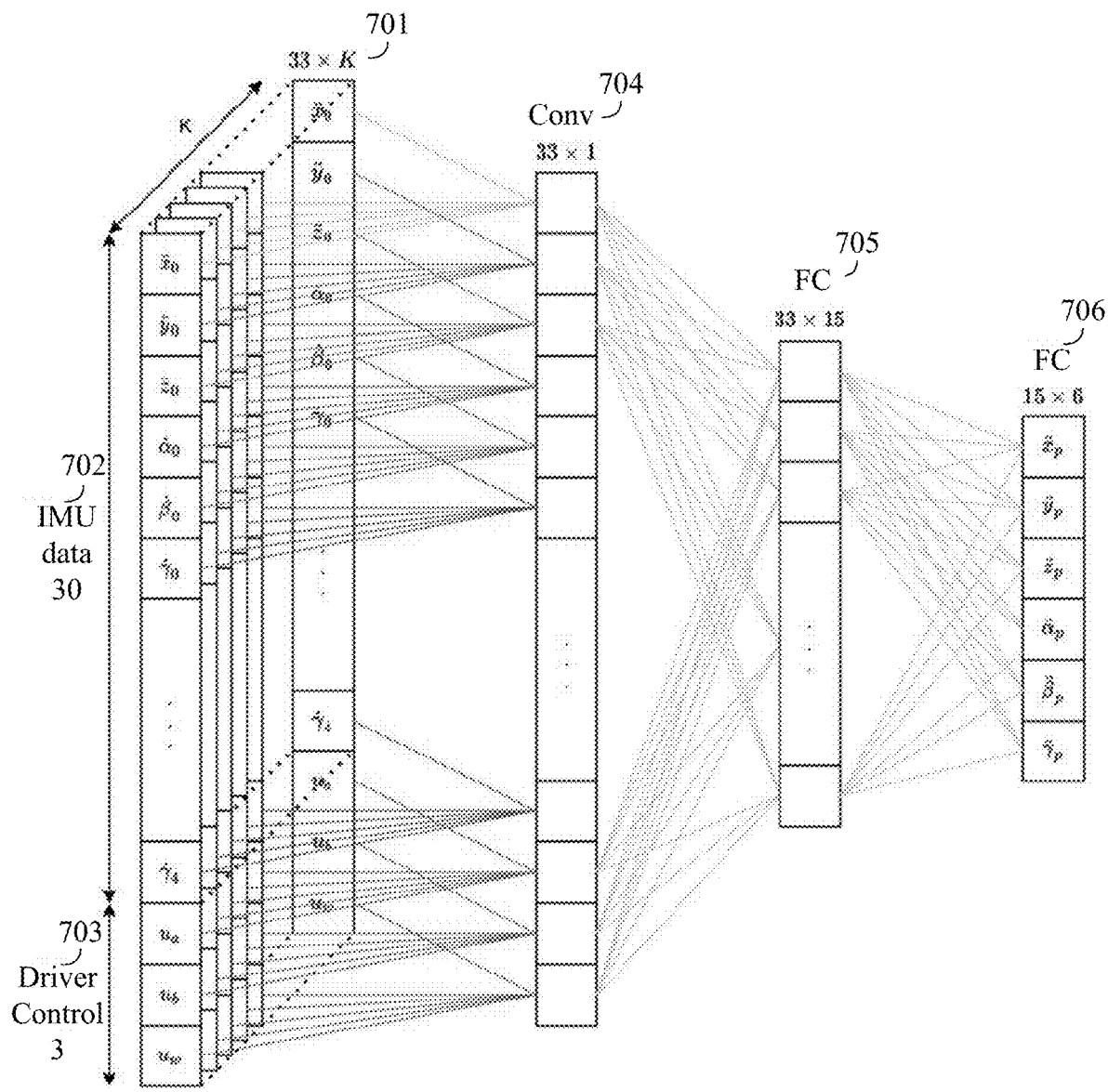
FIG. 7 shows an exemplary illustration of a convolutional neural network including layers.

FIG. 7 shows an exemplary illustration of a convolutional neural network including layers. The convolutional neural network may include an input layer 701. The input layer 701 may be configured to receive the first sensor data including the acceleration information 702 for the engine and four wheels of the vehicle, each having one data item for each of the axes of 6 axes, and the driving-related information 703 including information indicating the angle of the steering wheel, the throttle, and the brake of the vehicle for a time window of K samples.

The convolutional neural network includes a convolutional layer 704 to perform a convolutional operation for the data items which the input layer 701 receives based on the neural network. Accordingly, the output of the convolutional layer 704 may include a machine interpretation of the acceleration information 702 and the driving-related information for the window of K samples as convolutional data items.

Furthermore, the convolutional neural network may include fully connected layers 705, 706 that are collectively configured to receive the convoluted data items which the convolutional layer 704 provides and perform calculations according to the neural network model including the model parameters in the memory to provide the predicted acceleration of the active seat of the vehicle based on the data items received by the input layer 701 and the model parameters in the memory, as explained in accordance with FIG. 6.

Referring back to FIG. 6, the neural network may be configured to execute the training stage to adjust the model parameters in the memory based on information received during the last hours of driving the vehicle. Accordingly, a smaller set of sensor data may be configured to train the neural network at instances of time during a predetermined period that has occurred before the calculations to be performed at the inference stage for the prediction of the acceleration relating to the instance of time. The predetermined period may include an hour, two hours, or three hours. The neural network may be configured to provide the predicted acceleration with a performance achieving errors below the human comfort threshold as disclosed above.

Figure 8:
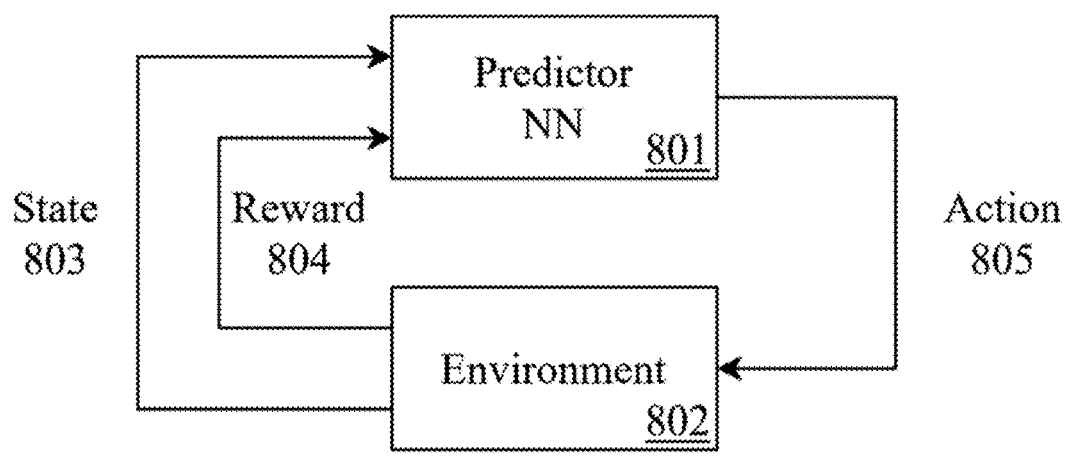
FIG. 8 shows an illustration for a neural network according to a reinforcement learning policy.

In one example, the predictor 613 may include a neural network that is configured to provide the predicted acceleration of the active seat based on the first sensor data according to a reinforcement learning model. FIG. 8 shows an illustration for a neural network according to a reinforcement learning policy. The predictor 613 may include a prediction neural network 801 that is configured to provide output by maximizing a reward value 804 according to a reward function based on a plurality of model parameters in a memory in response to a state 803 of the environment 802.

The state information 803 which the environment 801 provides may include the acceleration information which the sensors configured to detect the acceleration of the engine and the four wheels of the vehicle (e.g. the first sensor data). Furthermore, the reward function may include at least one parameter including an acceleration of the active seat (e.g. the second sensor data). The prediction neural network 801 may be configured to predict the acceleration of the active seat accordingly, and adjust the reward function based on the second sensor data based on a reward metric (e.g. a reward value).

The prediction neural network 801 may be configured to predict the acceleration of the active seat as the action 805 for an instance of time by maximizing a reward value 804 that is calculated based on the detected acceleration of the active seat at a previous instance of time and the first sensor data. The prediction neural network 801 may be configured to adjust the model parameters based on the detected acceleration of the active seat at the previous instance of time and the predicted acceleration which the prediction neural network 801 performed at the previous instance of time.

Referring back to FIG. 6, the predictor 613 may provide the predicted acceleration of the active seat to the controller 614. The controller 614 may be configured to generate a control signal based on the predicted acceleration of the active seat which the predictor performs 613. The predicted acceleration of the active seat $\ddot{X}_p$ may include a predicted acceleration information for each of the axes of 6 axes, as similar to detected acceleration as provided above, namely for each of the translational envelope including an x-axis, a y-axis, and a z-axis, and the rotational envelope including a rotation around the x-axis, a rotation around the y-axis, and a rotation around the z-axis. Accordingly, the controller 614 may generate the control signal to provide a countermovement by moving the seating of the active seat relative to the chassis of the vehicle in response to the information indicating the predicted acceleration.

Figure 9:
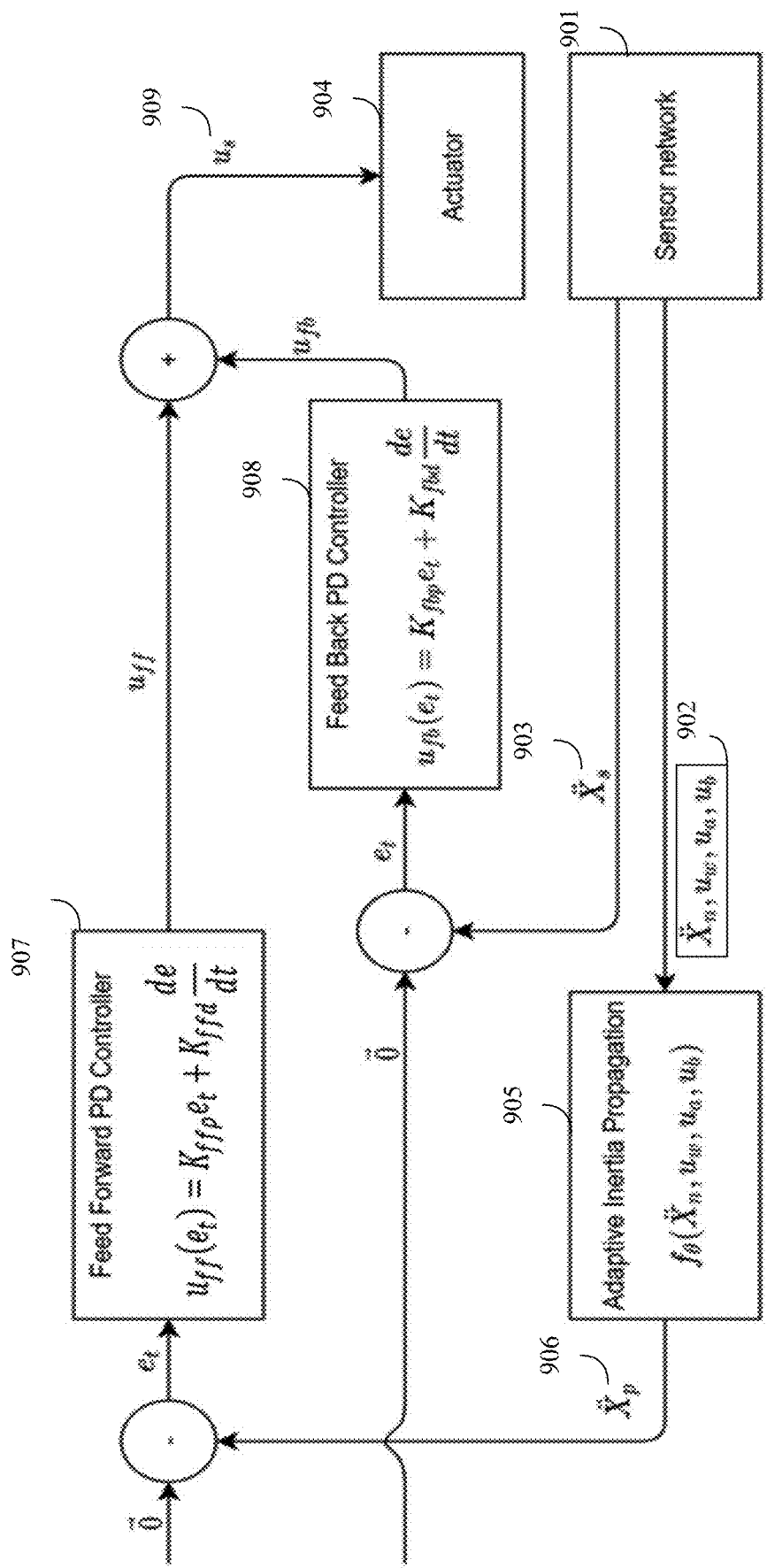
FIG. 9 shows schematically an illustration of a processing block.

FIG. 9 shows schematically an illustration of a processing block including a controller and a predictor. The predictor 905 may be coupled to a sensor network including the sensor network 901. The sensor network 901 may include sensors to detect acceleration of the vibration sources (e.g. engine and four wheels) that provide the information which the first sensor data 902 may include. The sensor network 901 may further include the sensor configured to detect the acceleration of the active seat that provides the second sensor data 903. The predictor 905 may provide the predicted acceleration 906 based on a transfer function (e.g. via a predetermined transfer function, via a neural network, etc.) as provided in this disclosure.

The controller may include a feedforward proportional derivative controller 907 that is configured to provide a first output signal based on an input signal relating to the predicted acceleration 906 according to a proportional gain parameter $K_{ffp}$ and a derivative gain parameter $K_{ffd}$. The controller may include a feedback proportional derivative controller 908 that is configured to provide a second output signal based on an input signal relating to the detected acceleration 903 according to a proportional gain parameter $K_{fbp}$ and a derivative gain parameter $K_{fbd}$.

The reference values have been depicted as zero vectors $\vec{0}$ with a desire to cancel the acceleration, though the skilled person would recognize further implementations based on the capability of components of the corresponding system. Accordingly, the terminology used as input signals relating to the sensor data should be noted. The controller may accordingly provide a control signal 909 to the actuator 904 of the active seat to provide a movement to the active seat based on the first output signal and the second output signal.

Referring simultaneously to FIG. 6 and FIG. 9, the controller 614 may be configured to operate at a plurality of operation modes to generate the control signal. The controller 614 may be configured to select an operation mode from a plurality of operation modes to generate a control signal to provide a movement to the active seat at the instance of time (i.e. first instance of time) based on a performance of the prediction. The controller may select the operation mode based on measured performance of the predicted acceleration 906 for at least one instance of time that has occurred before the instance of time (i.e. second instance of time).

The controller 614 may be configured to operate at a first operation mode. At the first operation mode, the controller 614 may be configured to generate a control signal 909 to provide a movement to the active seat at the first instance of time based on the predicted acceleration 906 relating to the first instance of time according to the first sensor data 902 and the detected acceleration 903 of the active seat according to the second sensor data 903. Accordingly, during the first operation mode, the feedforward proportional derivative controller 907 may provide the first output signal and the feedback proportional derivative controller 908 may provide the second output signal to generate the control signal 909.

The controller 614 may be configured to operate at a second operation mode. At the second operation mode, the controller 614 may be configured to generate a control signal 909 to provide a movement to the active seat at the first instance of time based on the detected acceleration 903 of the active seat at the second instance of time. At the second operation mode, the controller 614 does not consider (i.e. ignore, or disregard) the predicted acceleration 906. For example, at the second operation mode, the controller 614 may set at least one gain parameter relating to the predicted acceleration 906 information which the predictor 613 provides to zero. At the second operation mode, the controller 614 may generate the control signal 909 only based on the second sensor data 903. Accordingly, during the second operation mode, the feedforward proportional derivative controller 907 may not provide the first output signal, or provide the first output signal as zero, and the feedback proportional derivative controller 908 may provide the second output signal to generate the control signal 909.

The controller 614 may be configured to operate at a third operation mode. At the third operation mode, the controller 614 may be configured not to generate a control signal 909 at all. Alternatively, the controller 614 may be configured to generate a control signal 909 that may provide an indication to the active seat that the active seat is not to be moved at the first instance of time. The controller 614 may be configured to set at least one gain parameter relating to the predicted acceleration 906 information which the predictor 613 provides to zero and to set at least one gain parameter relating to the second sensor data 903 to zero. Accordingly, during the third operation mode, the feedforward proportional derivative controller 907 and the feedback proportional derivative controller 908 may not provide the first output signal and the second output signal respectively, or they may provide zero signal to generate the control signal 909.

The controller 614 may be configured to determine the mode of operation based on the detected acceleration. For example, when the controller 614 is configured to operate at the first operation mode for the second instance of time, and the controller 614 may determine to operate at the second operation mode based on the detected acceleration 903. The controller 614 may be configured to operate at the second operation mode in case the detected acceleration 903 is above a predefined threshold. The controller 614 may compare the detected acceleration 903 and the predefined threshold to determine that the controller 614 may operate at the second operation mode at the first instance of time.

Furthermore, when the controller 614 is configured to operate at the second operation mode for the second instance of time, and the controller 614 may determine to operate at the third operation mode based on the detected acceleration 903. The controller 614 may be configured to operate at the third operation mode in case the detected acceleration 903 is above a predefined threshold. The controller 614 may compare the detected acceleration 903 and the predefined threshold to determine that the controller 614 may operate at the third operation mode at the first instance of time.

Figure 10:
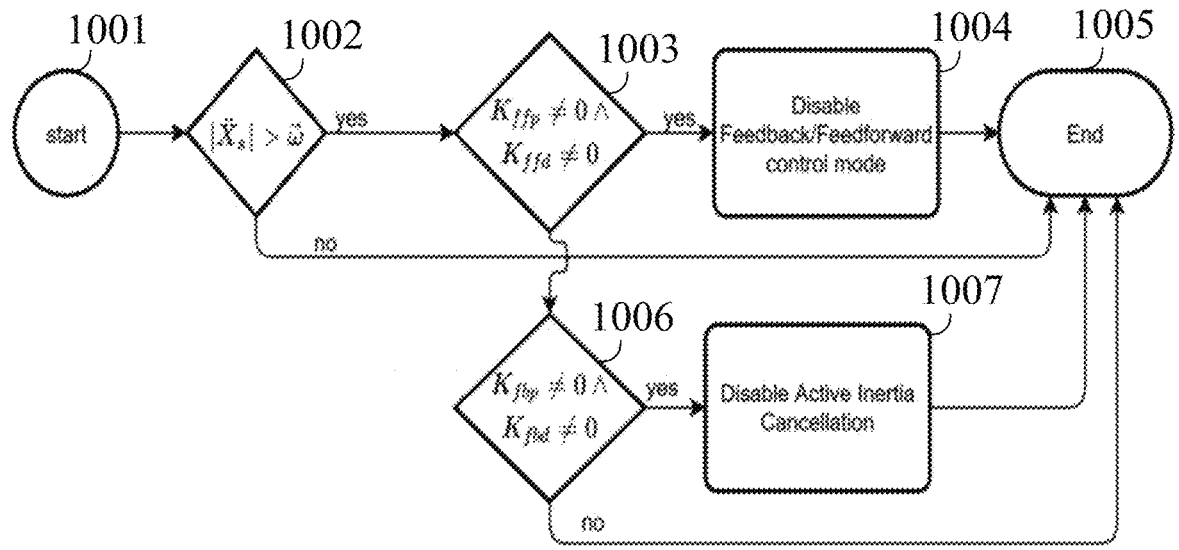
FIG. 10 shows an exemplary illustration of a mode selection.

FIG. 10 shows an exemplary illustration of a mode selection with the controller. The mode selection may include an initialization 1001 that may include accessing the detected acceleration for a second instance of time that occurred before a first instance of time. The controller may compare 1002 the detected acceleration with a predefined threshold. In case the absolute value of the detected acceleration is greater than the predefined threshold, the controller may check 1003 whether the controller operates at the first mode of operation.

The controller may check 1003 whether the controller operates at the first mode of operation by checking gain values of the corresponding feedforward proportional derivative controller. In case the controller determines that it operates at the first operation mode, the controller may disable 1004 the feedback/feedforward control mode which moves the controller to operate at the second operation mode for the first instance of time. The controller may finalize 1005 the mode selection for the first instance of time.

The controller may perform the mode selection for a third instance of time that will occur after the first instance of time. Accordingly, the controller may again perform the checks in 1002 and 1003. In case the controller determines 1003 that the controller is not configured to operate at the first operation mode (e.g. by checking gain values of the corresponding forward proportional derivative controller and recognizing that they are zero), the controller may check 1006 whether the controller operates at the second operation mode. The controller may check 1006 whether the controller operates at the second operation mode by checking gain values of the corresponding feedback proportional derivative controller.

In case the controller determines that it operates in the second operation mode, the controller may disable 1007 the active inertia cancellation which moves the controller to operate in the third operation mode. The controller may finalize 1005 the mode selection for the third instance of time. In case the controller determines 1006 that it operates in the third operation mode, the controller may finalize 1005 the mode selection. Furthermore, in case the controller determines 1002 that the detected acceleration is within the predefined threshold, the controller may operate at the first operation mode. The controller may also enable the feedback/feedforward control mode which operates the controller at the first operation mode in case the controller is not configured to operate at the first operation mode.

Figure 11:
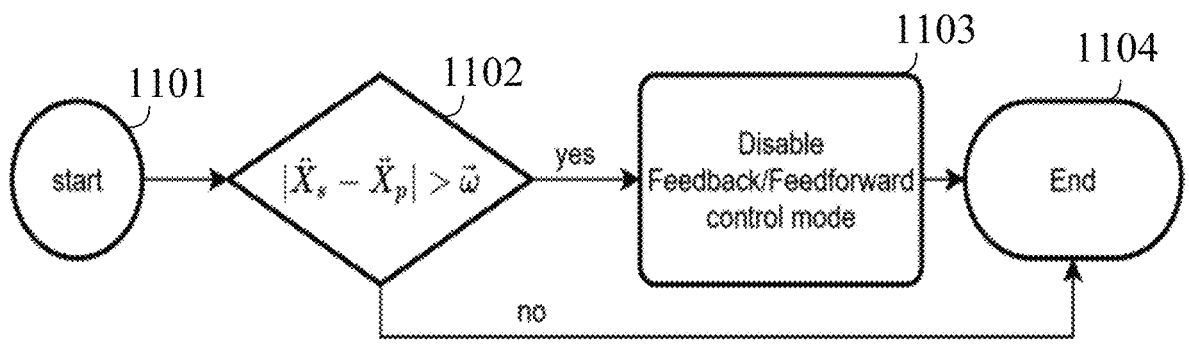
FIG. 11 shows an exemplary illustration of a mode selection.

FIG. 11 shows an exemplary illustration of a mode selection with the controller. In this example, the controller may be configured to select the mode of operation based on the detected acceleration and the predicted acceleration. The mode selection may include an initialization 1101 that may include accessing the detected acceleration and the predicted acceleration for a second instance of time that occurred before the first instance of time. The controller may compare 1102 an absolute difference of the detected acceleration and the predicted acceleration with a predefined threshold. In case the absolute value of the difference is greater than the predefined threshold, the controller may disable 1103 the feedback/feedforward control mode which moves the controller to operate at the second operation mode for the first instance of time. The controller may alternatively operate at the third operation mode for the first instance of time. The controller may check the operation mode for the second instance of time, and the controller may change the operation mode for the first instance of time. In case the absolute value of the difference is not greater than the predefined threshold, the controller may continue operating for the first instance of time at the operation mode of the second instance of time.

The predefined threshold may include a threshold that may indicate a defined threshold stored in the memory to represent a human sensitivity threshold. The predefined threshold may include a human sensitivity threshold which may be defined as approximately 0.1 m/s$^2$ for each axes of acceleration. Accordingly, the predefined threshold may be represented as $\vec{\omega}$=[0.1, 0.1, 0.1, 0.1, 0.1, 0.1] m/s$^2$ at six axes of movement.

Referring back to FIG. 6, the controller 614 may provide the generated control signal via the interface 603 to the active seat 610. The active seat 610 may include an active seat as defined in accordance with FIG. 4. The control signal may include information indicating an acceleration for each of the axes suitable for the active seat 610 (e.g. six axes for six degrees of freedom), for at least an instance of time.

Based on the control signal received from the interface 603 of the device 601, the active seat 610 may provide the countermovement in order to dampen the acceleration that the active seat 610 may transfer to the occupant via a seating on which the occupant is located.

The device 601 may further be coupled to a plurality of active seats for a plurality of occupants via the interface 603. The processor 602 may be configured to generate one control signal, and the interface 603 may provide the generated control signal to the plurality of active seats. Furthermore, the interface 603 may be coupled to a plurality of inertial measurement units that are configured to provide a detected acceleration for the plurality of active seats. The processor 602 may generate a control signal for each of the plurality of active seats based on a predicted acceleration for each of the plurality of active seats and the second sensor data including a detected acceleration of the corresponding active seat from the plurality of active seats.

Figure 12:
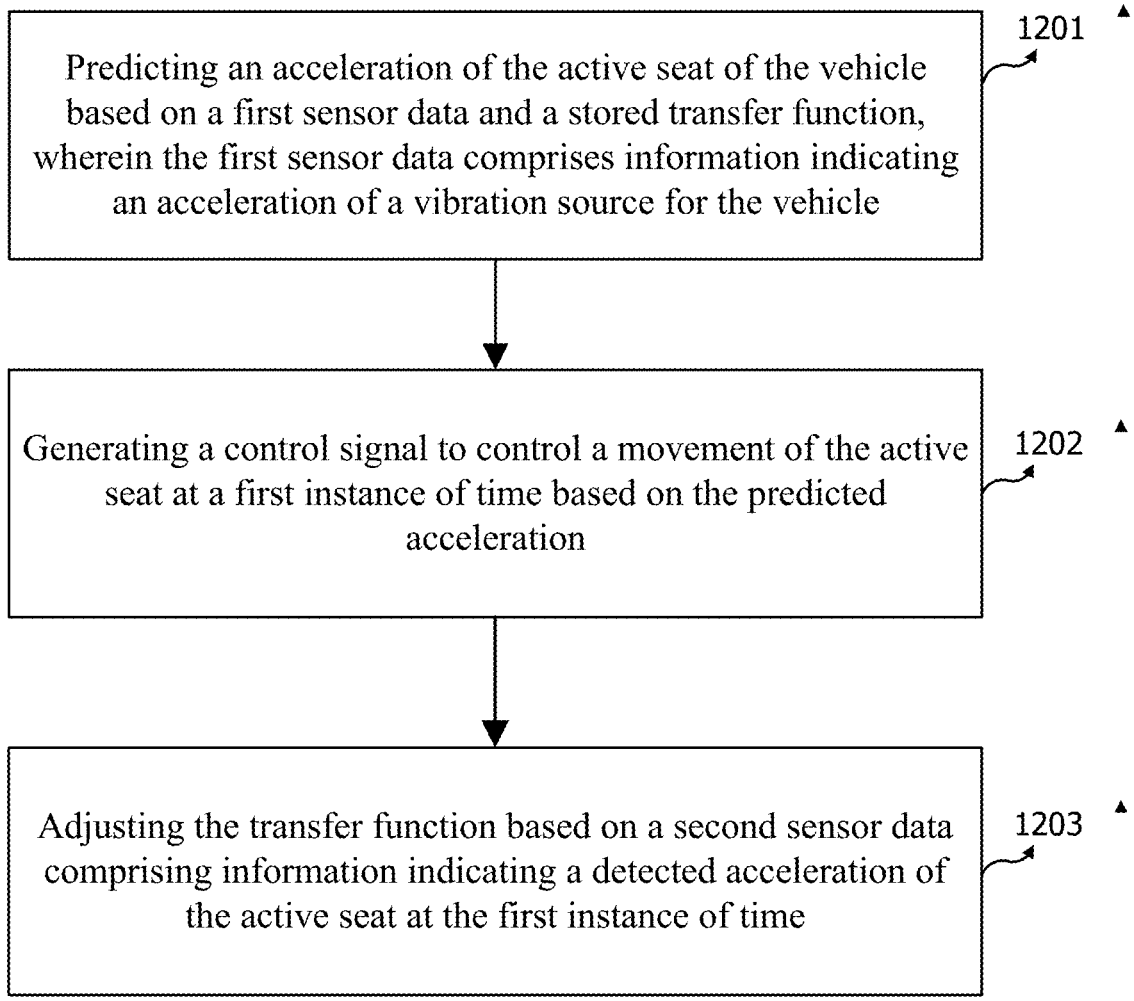
FIG. 12 shows schematically an example of a method.

FIG. 12 shows schematically an example of a method. The method may include predicting 1201 an acceleration of the active seat of the vehicle based on a first sensor data and a stored transfer function, wherein the first sensor data includes information indicating an acceleration of a vibration source for the vehicle, generating 1202 a control signal to control a movement of the active seat at a first instance of time based on the predicted acceleration, adjusting 1203 the transfer function based on a second sensor data including information indicating a detected acceleration of the active seat at the first instance of time. A non-transitory computer-readable medium may include one or more instructions to perform the method on a processor.

As mentioned earlier, the discomfort that the vehicle may affect with its movement may also include motion sickness. Motion sickness may occur during traveling in a vehicle, where conflicting inputs are sent to the brain from different senses of the individual's body (e.g., the muscles may sense that the individual is moving in a car, while the eyes of the individual having fixed onto a book/phone may send the signal that the individual stands still). With fully autonomous vehicles, more people may be handing over the control to their vehicles, and thus may become more prone to this condition.

The motion sickness may affect anyone during the course of driving the vehicle. In general, motion sickness may be considered as it is positively correlated with the controllability of the vehicle. Accordingly, the drivers had been considered as they experience less motion sickness than other occupants of the vehicle. As the expected control to be provided by the driver may diminish according to various levels of autonomous driving, the drivers may also become prone to motion sickness as certain driving functions are now transferred to the vehicle. It may be desirable to address concerns related to motion sickness to increase the comfort of the occupants of vehicles.

Furthermore, the motion sickness condition may vary among individuals, and potential mitigation strategies with a desire to reduce motion sickness for the individual may not result in an effective solution for each occupant of a vehicle. The discomfort level and potential mitigation strategies may be different for each occupant. Accordingly, a personalized approach may be desirable in order to detect the motion sickness that an occupant may experience and in order to provide a mitigating solution in response to the detected motion sickness. It may be further desirable to identify early signs of developing motion sickness and provide countermeasures through the vehicle.

Figure 13:
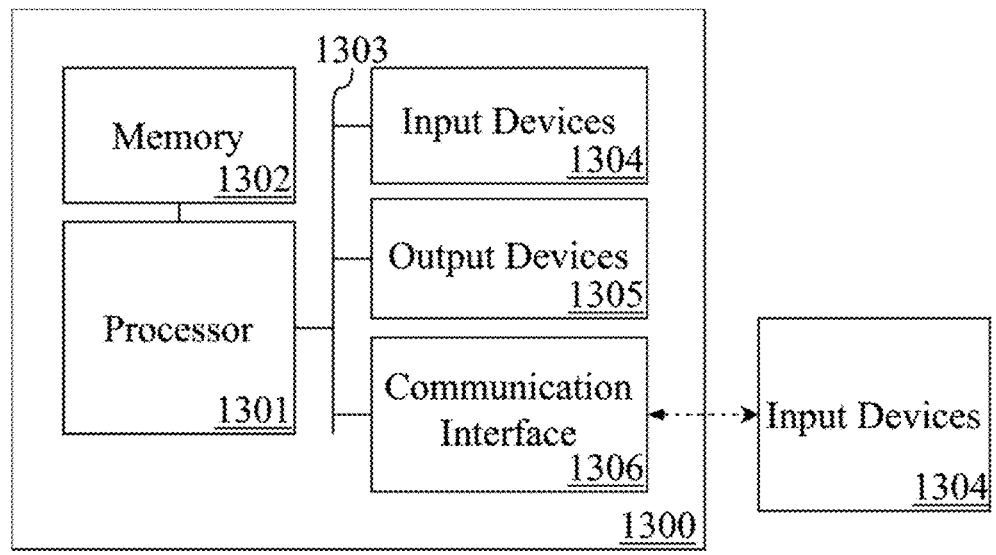
FIG. 13 shows schematically an example of a device for monitoring an occupant of a vehicle.

FIG. 13 shows schematically an example of a device for monitoring an occupant of a vehicle. A vehicle or an occupant/driver monitoring system may include the device 1300 with the input and output devices, and also other entities provided in this disclosure. The vehicle may be the vehicle and the control system according to FIG. 1 and FIG. 2 that may include the device 1300 for identifying an occupant of a vehicle. The control system may include the device 1300.

The device 1300 includes a processor 1301. The processor 1301 may be configured to access environmental data including information indicating a state of the environment of the vehicle. The processor 1301 may be configured to receive the environmental data as an input. Furthermore, the processor 1301 may be configured to determine an action to be performed by the vehicle according to the environmental data. The processor 1301 may be configured to determine the action according to a reinforcement learning model based on the state provided by the environmental data. The processor 1301 may be configured to perform the reinforcement learning model by maximizing a reward function including at least one parameter based on data. The data may include information indicating motion sickness of the occupant. The data may include sensor data.

The device 1300 may further include a memory 1302. The memory 1302 may store the environmental data and the data indicating motion sickness. The device 1300 may include an interface 1303 coupled to the processor 1301. The processor 1301 may access the environmental data and receive the data indicating motion sickness via the interface 1303. The device 1300 may include one or more input devices 1304 that are configured to provide input to the device 1300. Alternatively, the interface 1303 may be communicatively coupled to the input devices 1304 via the communication interface 1306.

The input devices 1304 may include one or more sensors, other data acquisition units, measurement devices, position devices, storage units, advanced driving assistance systems, or other devices that are configured to provide an input to the device 1300. These devices may be configured to provide environmental data including information indicating a feature related to the environment of the vehicle. For example, the input devices 1304 may include interior systems 118, and/or data acquisition units 112, and/or measurement devices, position devices 114, memory 104 of the vehicle as discussed with respect to FIG. 1 and FIG. 2.

The input devices 1304 may include image acquisition devices, motion detectors, multimodal sensors, etc., for providing data that relates to an occupant of the vehicle (e.g. about the interior of the vehicle including the occupant). Image acquisition devices may include cameras (e.g., multimodal cameras, standard cameras, digital cameras, video cameras, single-lens reflex cameras, infrared cameras, stereo cameras, depth cameras, RGB cameras, depth cameras, etc.), charge coupling devices (CCDs), or any type of image sensor.

The input devices 1304 may further include further sensors that are configured to provide health related data for an occupant of the vehicle. For example, the sensors providing the health related data may be located at a seat or at a seatbelt of the vehicle that are configured to be in contact or in a proximity of the occupant. Furthermore, a user device of an occupant may be communicatively coupled to the device 1300 as an input device via the communication interface 1306, and the user device of the occupant may provide occupant related information (e.g. health related data) for the occupant. The user device of the occupant may include sensors to provide occupant related information based on a detection.

The processor 1301 may be configured to receive data from the input devices 1304. The data may include environmental data including information indicating a feature of the environment of the vehicle, or occupant data including information indicating a detected feature of the occupant. The interface 1303 may receive the data from one or more of the input devices 1304, and provide the data to the processor 1301. The interface 1303 may receive the data from one or more of the input devices 1304 and the memory 1302 may store the data. Furthermore, a user device of the occupant may be communicatively coupled to the device 1300 as an input device via the communication interface 1306, and the user device of the occupant may provide information for other types of environmental data. The user device of the occupant may include sensors to provide information (e.g. driving related information, interior information) based on a detection.

The interface 1303 may be coupled to the input devices 1304 via any communication means. The interface 1303 may be coupled to the input devices 1304 electrically (e.g. via a wired connection) to receive data that the input devices 1304 provide. The device 1300 may include the communication interface 1306 to manage the communication with the input devices 1304. The communication interface 1306 may be communicatively coupled to the input devices 1304 (via wired or radio communication), and the communication interface 1306 may provide the data received from the input devices 1304 to the interface 1303. The communication interface 1306 may receive the data over a communication network or via peer-to-peer communication (e.g. ad-hoc) from the input devices 1304. Furthermore, the device 1300 may be communicatively coupled to other systems or components of the vehicle (e.g. advanced driver-assistance systems, electronic control unit, etc.) via the communication interface 1306 to receive data.

The device 1300 may further include one or more output devices 1305 to provide an output. Alternatively, or additionally, the interface 1303 may be communicatively coupled to the output devices 1305. The interface 1303 may be coupled to the output devices 1305 via any communication means. The interface 1303 may be coupled to the output devices 1305 electrically (e.g. via a wired connection) to provide an output. The communication interface 1306 may also manage the communication with the output devices 1305.

The communication interface 1306 may be communicatively coupled to the output devices 1305 (via wired or radio communication), and the processor 1301 may provide an output to the interface 1303. The communication interface 1306 may receive the output and provide the output to the output devices 1305. The communication interface 1306 may provide the output over a communication network.

The output devices 1305 may include the control system of the vehicle or components coupled to the control system of the vehicle. The device 1300 may be communicatively coupled to the control system of the vehicle in order to provide a control signal based on the action that the processor 1301 may determine. The device 1300 may be a part of the control system of the vehicle, and output devices may include a processor (e.g. application processor) of the control system.

Figure 14:
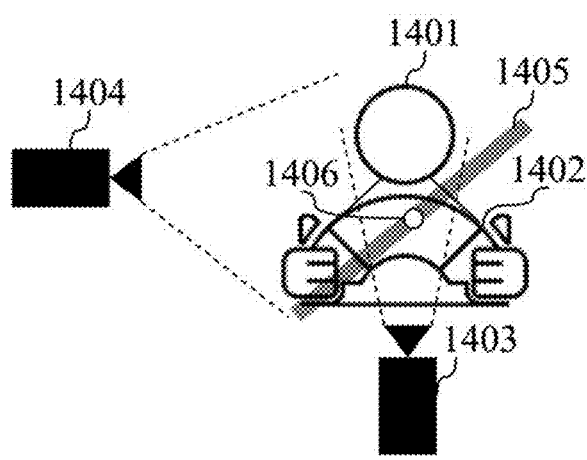
FIG. 14 shows schematically an exemplary illustration including an occupant.

FIG. 14 shows schematically an exemplary illustration of an occupant. An occupant 1401 is depicted as a driver holding a steering wheel 1402. A first sensor 1403 including a camera (e.g. a camera in a dashboard of a vehicle) may be configured to provide data including information indicating a facial attribute of the occupant 1401. A second sensor 1404 including a camera (e.g. a side camera in the vehicle) may be configured to provide data including information indicating a body attribute of the occupant 1401. The driver may be wearing a seat belt 1405, and the seat belt 1405 may include a third sensor that is configured to detect the breathing pattern and/or the heart rate of the occupant 1401. In this example, the first sensor 1403, the second sensor, and the third sensor may be considered examples of input devices that are coupled to the vehicle.

Referring back to FIG. 13, the processor 1301 may receive data from the input devices 1304 to obtain the environmental data. The environmental data may indicate a state related to the vehicle. Alternatively, or additionally, the processor 1301 may receive the environmental data indicating a state related to the vehicle from another entity. For example, the processor 1301 may access a memory of the control system of the vehicle to obtain the environmental data. The state related to the vehicle may include a state related to the occupant of the vehicle. The environmental data may include any of the data provided in this disclosure.

The environmental data may include occupant related information indicating a feature related to the occupant. In particular, the indicated feature may relate to various features that may be linked to the detection of motion sickness of the occupant. The occupant related information may include the plurality of images, and/or any of the information that the processor 1301 may estimate based on the plurality of images, in particular, information such as estimated facial action, estimated skin tone, or change of the skin tone, estimated sweat rate or change of the sweat rate, estimated breathing pattern or change of the breathing pattern, estimated heart rate or change of the heart rate.

The input devices 1304 may include one or more cameras. A camera may be configured to provide a plurality of images (e.g. real time video). The cameras may be configured to capture facial attributes of the occupant, and accordingly, the data that the cameras provide may include information indicating facial attributes of the occupant. The cameras may be configured to provide images related to multiple modalities (e.g. infra-red imaging, depth imaging, thermal imaging, etc.). Furthermore, the data may include color information (e.g. RGB, CMYK). Furthermore, the input devices 1304 may include a high-resolution radar, and/or light detection and ranging radar (LIDAR) sensors configured to provide visual information (e.g. depth information, image) related to the occupant. Such applications may be implemented with a desire to obtain more robust detection based on lighting conditions.

The processor 1301 of the device 1300 may perform various image processing methods on the images in order to determine a motion sickness feature including a feature related to the motion sickness of the occupant. There are various methods to estimate motion sickness for a person using visual cues (i.e. actions) that may be detected visually (e.g. based on the gaze of a person, a head posture of a person, pupil dilation, etc.). The processor 1301 may be configured to estimate a facial action based on the images received from the camera. The processor 1301 may be further configured to determine a motion sickness score based on the estimated facial action of the occupant.

The processor 1301 may be configured to estimate the facial action by classifying a detected facial action of the occupant according to a plurality of reference facial actions stored in the memory 1302. The processor 1301 may select one of the plurality of reference facial actions stored in the memory 1302 as the estimated facial action, in which the selected reference facial action has the most similarity to the detected facial action. Furthermore, each of the plurality of reference facial actions may correspond to a motion sickness score, and the processor 1301 may determine the motion sickness score of the estimated facial action based on the motion sickness score of the selected reference facial action.

The processor 1301 may further be configured to estimate a skin tone based on the images received from the camera. Alternatively, or additionally, the processor 1301 may receive the data including information indicating a skin tone of the occupant from another component or system of the vehicle, or a user device of the occupant. The processor 1301 may be configured to estimate the skin tone by selecting one of the plurality of reference skin tones stored in the memory as the estimated skin tone, in which the selected reference skin tone has the most similarity to the detected skin tone of the occupant.

Furthermore, the processor 1301 may determine a change of the estimated skin tone of the occupant based on a detected skin tone at a first instance of time and a detected skin tone at a second instance of time. The processor 1301 may determine a motion sickness score of the estimated skin tone at the first instance of time based on the change of the estimated skin tone between the estimated skin tone of the first instance of time and the estimated skin tone of the second instance of time. The memory 1302 may include information indicating a motion sickness score for various change levels, and the processor 1301 may determine the motion sickness score for the change of the estimated skin tone at the first instance based on the information stored in the memory.

The processor 1301 may further be configured to estimate a sweat rate (a rate of sweating of the occupant) based on the images received from the camera. The processor 1301 may be configured to extract information indicating the sweat rate of the occupant using various image processing methods. Alternatively, or additionally, the processor 1301 may receive the data including information indicating the sweating or the sweat rate of the occupant from another component or system of the vehicle, or a user device of the occupant, or a sweat sensor. The processor 1301 may be configured to estimate the sweat rate of the occupant by selecting one of the plurality of reference sweat information indicating a sweat rate stored in the memory as the estimated sweat rate, in which the selected sweat information has the most similarity to the received sweat information the occupant.

Furthermore, the plurality of reference sweat information in the memory 1302 may include a motion sickness score, and the processor 1301 may determine a motion sickness score for the estimated sweat rate of the occupant based on the information in the memory 1302. The processor 1301 may use a transfer function to calculate a motion sickness score for the sweat rate of the occupant based on the estimated sweat rate of the occupant. The processor 1301 may determine the motion sickness score for the estimated sweat rate of the occupant based on a change of the sweat rate of the occupant between a first instance of time and a second instance of time similar to the determination related to the skin tone.

The processor 1301 may further be configured to estimate a breathing pattern of the occupant based on the images received from the camera. The processor 1301 may be configured to extract information indicating the breathing pattern of the occupant using various image processing methods. Alternatively, or additionally, the processor 1301 may receive the data including information indicating a breathing pattern of the occupant from another component or system of the vehicle, or a user device of the occupant, or a breathing or motion sensor. The breathing pattern may include a breathing rate. The processor 1301 may be configured to estimate the breathing pattern of the occupant by selecting one of the plurality of reference breathing patterns stored in the memory as the estimated breathing pattern, in which the selected sweat information has the most similarity to the received breathing pattern the occupant.

Furthermore, the plurality of reference breathing patterns in the memory 1302 may include a motion sickness score, and the processor 1301 may determine a motion sickness score for the estimated breathing pattern of the occupant based on the information in the memory 1302. The processor 1301 may use a transfer function to calculate a motion sickness score for the breathing pattern of the occupant based on the estimated breathing pattern (e.g. rate) of the occupant. The processor 1301 may determine the motion sickness score for the estimated breathing pattern of the occupant based on a change of the breathing pattern of the occupant between a first instance of time and a second instance of time similar to the determination related to the skin tone.

The processor 1301 may further be configured to estimate a heart rate of the occupant based on the images received from the camera. The processor 1301 may be configured to extract motion information indicating the heart rate of the occupant using various image processing methods. Alternatively, or additionally, the processor 1301 may receive the data including information indicating a heart rate of the occupant from another component or system of the vehicle, or a user device of the occupant, or a heart rate or motion sensor. The processor 1301 may be configured to estimate the heart rate of the occupant by selecting one of the plurality of reference heart rates stored in the memory as the estimated heart rate, in which the selected sweat information has the most similarity to the received breathing pattern the occupant.

Furthermore, the plurality of reference heart rates in the memory 1302 may include a motion sickness score, and the processor 1301 may determine a motion sickness score for the estimated heart rate of the occupant based on the information in the memory 1302. The processor 1301 may use a transfer function to calculate a motion sickness score for the heart rate of the occupant based on the estimated heart rate of the occupant. The processor 1301 may determine the motion sickness score for the estimated heart rate of the occupant based on a change of the heart rate of the occupant between a first instance of time and a second instance of time similar to the determination related to the skin tone.

The processor 1301 may be configured to receive driving-related information which the input devices 1304 may provide. The input devices 1304 that may provide the driving-related information may include the control system of the vehicle or a component of the control system. The processor 1301 may access a storage via the communication interface 1306 (e.g. the storage of the control system) to receive the driving-related information.

The driving-related information may include information indicating the interaction of the vehicle with the road environment. The driving-related information may include indication related to speed or velocity of the vehicle. The driving-related information may include indication related to acceleration of the vehicle. The driving-related information may include indication related to heading of the vehicle.

The driving-related information may include indication related to route of the vehicle. The indication related to the route of the vehicle may include information indicating at least a route of the vehicle in a period of time for the past (e.g. past route), or information indicating at least a route of the vehicle in a period of time in the future (e.g. future route, or estimated route). The indication related to route may include information indicating an estimated curvedness degree of the route. The processor 1301 may be further configured to estimate a curvedness degree based on the information indicating a route. The curvedness degree may provide an indication of how curved the route is.

The processor 1301 may be configured to receive interior information indicating at least one feature related to the interior (e.g. cabin) of the vehicle, which the input devices 1304 may provide. The input devices 1304 that may provide the interior information may include the control system of the vehicle or a component of the control system. The processor 1301 may access a storage via the communication interface 1306 (e.g. the storage of the control system) to receive the interior information.

The interior information may include a location of the occupant in the vehicle. The location information may include a two dimensional location information or a three dimensional location information. The interior information may include a position of a seat of the vehicle. The interior information may include an angle of the seat relative to the movement of the vehicle. The interior information may include a detected temperature of the interior of the vehicle.

The processor 1301 may be configured to estimate the interior information based on the data received from the input devices 1304. For example, the processor 1301 may be configured to estimate the location of the occupant based on the images received from a camera. Similarly, the processor 1301 may be configured to determine the position of the seat on which the occupant is located based on the images received from the camera. Furthermore, the processor 1301 may be configured to determine the angle of the seat relative to the movement of the vehicle based on the images received from the camera. The processor 1301 may be configured to perform an image processing method on the images received from the camera to perform these estimations.

As the processor 1301 may be configured to receive data from the input devices 1304 continuously, the processor 1301 may update determined motion sickness scores for each of the features, as the data provided by the input devices changes on time. The processor 1301 may be configured to store each of the determined motion sickness scores in a time series data structure for every instance of time that the processor 1301 determines the respective motion sickness scores. The processor 1301 may update the driving-related information and the interior information in a similar manner. The processor 1301 may be further configured to store each of the information in their corresponding time series data structures for every instance of time.

The processor 1301 may be configured to combine the data received from the input devices 1304 to obtain the environmental data. The processor 1301 may be configured to synchronize the information which the input devices 1304 provide in order to map the features indicated with the data to an instance of time, or to a plurality of instances of time. Accordingly, each data item of the environmental data relating to an instance of time may provide corresponding information for that instance of time. In other words, the environmental data may include the information which the input devices 1304 provide according to the aspects described above as a time series data.

Although this disclosure may provide various examples with respect to information that the environmental data may include, the environmental data may not necessarily be required to include information provided for each of the examples. The environmental data may include one, or preferably, a plurality of the information provided according to various examples in this disclosure. The environmental data may include any combination of the provided examples.

The processor 1301 may synchronize the information using various functions. The data that are provided by the input devices 1304 may include time information indicating a time for detection of the corresponding feature (e.g. time stamp). The processor 1301 may use time information received by the communication interface 1306 which an input device 1304 may generate. The processor 1301 may generate time information for the data as they are received by the communication interface 1306.

Furthermore, the processor 1301 may be configured to combine the determined motion sickness score in order to obtain a combined motion sickness score. The processor 1301 may combine the motion sickness scores by calculating an average from each of the determined motion sickness scores. The processor 1301 may calculate the average in a weighted average manner, by assigning a weight parameter for each of the determined motion sickness scores. Each determined motion sickness score or the combined motion sickness score may also include a motion sickness score for an instance of time. Accordingly, each motion sickness score may relate to a motion sickness score for the instance of time.

Figure 15:
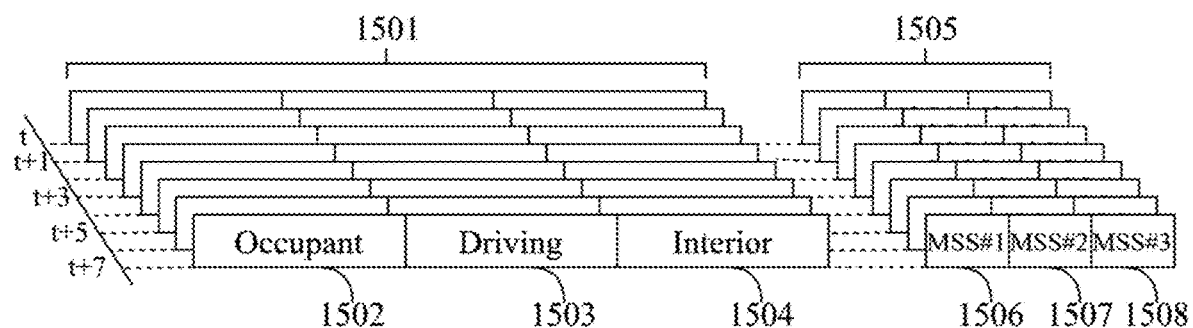
FIG. 15 shows schematically an exemplary illustration of environmental data and motion sickness data.

FIG. 15 shows schematically an exemplary illustration of environmental data and motion sickness data. The environmental data 1501 may include occupant related information 1502, driving-related information 1503, and/or interior information 1504. The motion sickness data 1505 may include motion sickness scores 1506, 1507, 1508 based on the occupant related information at the corresponding instance of time. As depicted in the illustration, the environmental data 1501 and the motion sickness data 1505 are structured based on a plurality of instances of time according to the synchronization, such that the corresponding information is provided for the corresponding instance of time.

Figure 16:
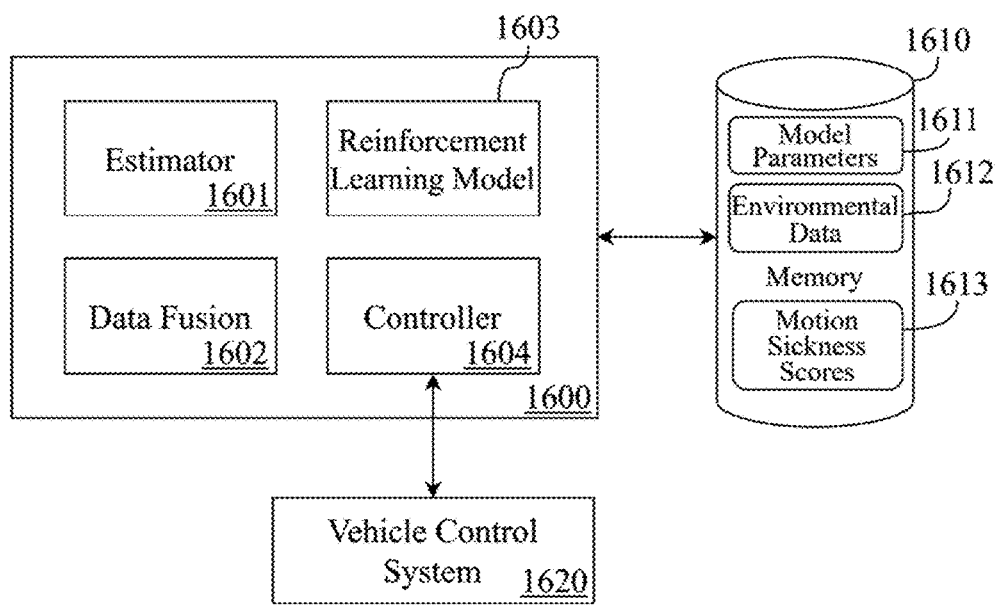
FIG. 16 shows schematically an example of various blocks of a processor coupled to a memory.

FIG. 16 shows schematically an example of various blocks of a processor coupled to a memory. The device referred with respect to FIG. 13 may include the processor 1600 and the memory 1610. Alternatively, another entity (e.g. control system of the vehicle) may include the memory 1610. The processor 1600 may include an estimator block 1601 that is configured to perform the estimations based on the data received from input devices as mentioned with respect to FIG. 13. The estimator block 1601 may optionally generate motion sickness scores as provided. The memory 1610 may store the motion sickness scores 1613. Furthermore, the processor may include a data fusion block 1602 that is configured to combine the data received from input devices to obtain the environmental data 1612 as exemplary provided in this disclosure. The memory 1610 may store the environmental data 1612.

The processor 1600 may further include a reinforcement learning block 1603 configured to execute a reinforcement learning model. The reinforcement learning block 1603 may be configured to determine a state of the environment based on the environmental data 1613 according to model parameters 1611 stored in the memory 1610. The determined state of the environment may include a state of the environment at a first time instance. Furthermore, the reinforcement learning block 1603 may be configured to determine an action to be performed by the vehicle based on the determined state of the environment. The reinforcement learning block 1603 may determine the action by selecting an action from a plurality of actions, in which the selected action may maximize a reward function according to at least one parameter based on data including information indicating motion sickness of the occupant. The parameter based on the data including information indicating the motion sickness of the occupant may include a motion sickness score 1613, or a combined motion sickness score 1613.

Figure 17:
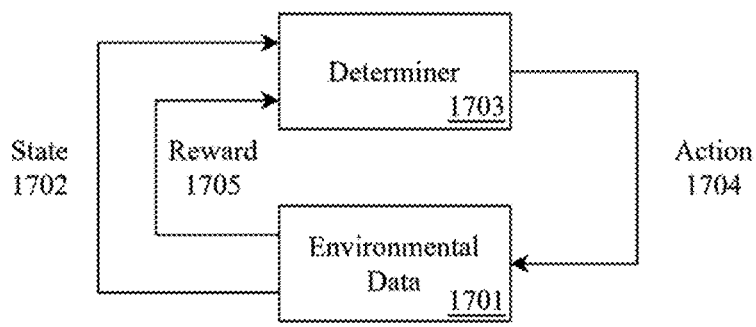
FIG. 17 shows an illustration of a reinforcement learning model.

FIG. 17 shows an illustration of a reinforcement learning model. The reinforcement learning model may access environmental data 1701 representing the environment at a first instance of time. The environmental data 1701 may indicate a state 1702 of the environment to a determiner 1703. The determiner 1703 may determine an action to be taken by the vehicle according to a model policy. The model policy may include a reward function.

The performed action 1704 may generate an effect on the environmental data 1701 at a second instance of time corresponding to another state of the environment. Based on the generated effect (e.g. a change of a motion sickness score), the model may generate a reward 1705 based on the change of the motion sickness score. Furthermore, the model may adjust the reward function based on the generated reward according to the change of the motion sickness score. Accordingly, with every iteration at a time instance, the reinforcement learning model may determine an action, measure the effect of the determined action, and adjust the reward function based on the effect of the determined action.

In other words, the determiner 1703 may map a state 1702 of the environment which the environmental data 1701 indicates to an action 1704 to be performed according to the reward function of the reinforcement learning model. The reward function may include at least one parameter that the determiner 1703 may update for each action 1704 based on a reward value based on occupant related information of the environmental data 1701 indicating the motion sickness score of the occupant. For example, the reward value may relate to a motion sickness score or a combined sickness score.

The determiner 1703 may determine the action 1704 to be performed based on the reward function by selecting an action from a plurality of actions in a memory. Each of the plurality of actions may correspond to a candidate reward value based on the reward function. The memory may store the candidate reward values for each of the plurality of actions. The plurality of actions may include at least one driving action and/or at least one occupant action.

Accordingly, the determiner 1703 may select any of these actions that may maximize the reward function. The term with respect to maximizing the reward function may refer to any type of calculations or assignments that the determiner 1703 may determine that the selected action may provide the most reward value at the second instance of time (e.g. at the second state) based on at least one parameter in the memory. Alternatively, or additionally, the determiner 1703 may select the action that may provide the most reward value after a period of time including a plurality of instances of time (e.g. in multiple states following the first state cumulatively).

Figure 18:
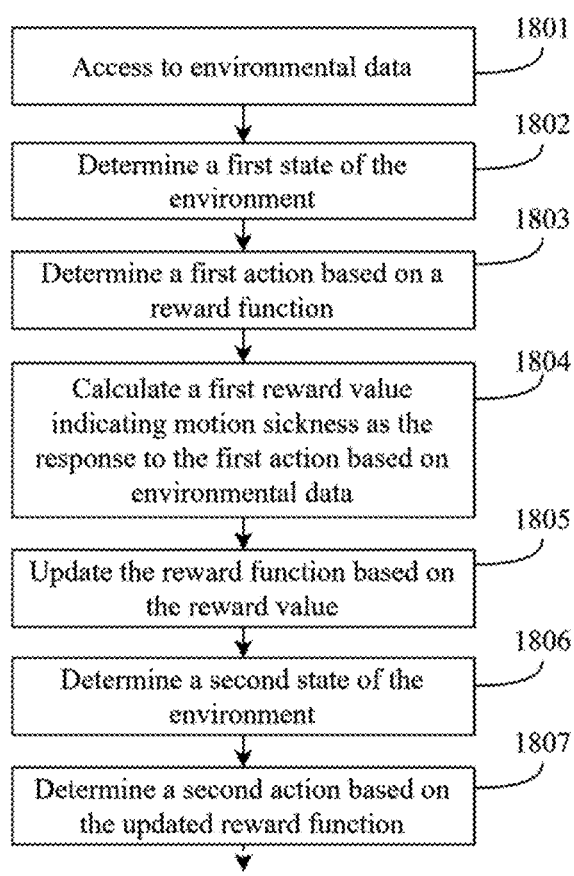
FIG. 18 shows an illustration of a flow relating to the reinforcement learning model.

FIG. 18 shows an illustration of a flow relating to the reinforcement learning model. The model initially may access 1801 to environmental data stored in a memory. The model may determine 1802 a first state of the environment based on the environmental data, wherein the first state of the environment may provide indication with respect to a first instance of time. The model may determine 1803 a first action to be performed by the vehicle with a desire to reduce the motion sickness of an occupant based on a reward function. The reward function may be configured to map the first state of the environment to the first action which is expected to provide the most reward value based on model parameters in the memory.

The model may calculate 1804 a first reward value based on the environmental data with respect to a second instance of time, wherein the second instance of time includes an instance of time after the determined action is performed by the vehicle. The model may calculate the first reward value indicating motion sickness of the occupant as a response to the first action. Based on the calculation, the model may update 1805 the reward function.

The model may continue by determining 1806 a second state of the environment based on the environmental data (e.g. the environmental data with respect to the second instance of time, or a third instance of time, etc.), determining 1807 a second action based on the updated reward function, etc. Accordingly, with each iteration that the model performs, the model may update the parameters of the reward function with a desire to determine an action that will provide the maximum reward value. The model may be pre-trained by performing various simulations including various environments and various occupants.

Referring back to FIG. 16, the reinforcement learning block 1603 may access the environmental data 1612 in the memory 1610 determine a state of the environment and determine an action based on the state of the environment and the model parameters 1611 (e.g. parameters with respect to reward function) in the memory 1610. The reinforcement learning block 1603 may select an action from a plurality of actions. The model parameters 1611 may include indications with respect to the plurality of actions. The plurality of actions may include a driving action referring to a driving function to be performed by the vehicle, which may affect all occupants in the vehicle. The plurality of actions may further include an occupant action referring to an action directed to an occupant in the vehicle.

For example, driving actions may include adjusting the speed of the vehicle, adjusting the acceleration/deacceleration of the vehicle, selecting a route from a plurality of predetermined routes. Driving actions may also include how much the adjustment will be made. Occupant actions may include adjusting the seat of the occupant, rotating the seat of the occupant, rotating the seat of the occupant to align the occupant with the movement of the vehicle, moving the seat of the occupant based on an acceleration of the vehicle, activating the air conditioner of the vehicle, adjusting the airways of the vehicle to provide a stream of air towards the occupant, providing information indicating a change of the position of the occupant, indicating a gaze direction to the occupant, indicating a head posture to the occupant, or displaying a real or a virtual route-aligned content on a display of the vehicle.

For example, such actions may further include altering speed/acceleration based on the route (e.g., if the vehicle is approaching a curve, the vehicle may start slowing down early to minimize the effect of acceleration), changing the overall route to minimize the number of curves encountered, rotating seats to align the occupant with the direction of the vehicle, moving seat within a minimal range to compensate partially for the vehicle's acceleration, activating and directing air conditioner airways towards the occupant for relief, diffusing calming scents (e.g., lavender) through air conditioner airways, using lights/displays of the vehicle (e.g., windows can also be used as ubiquitous displays) within the cabin to guide the occupant with specific gaze direction or head tilt, showing real or virtual route-aligned content through displays (either real-world road video feed or customized virtual content such as a boat sailing in the same direction as the vehicle).

The reinforcement learning block 1603 may be configured to provide information indicating the determined action to a controller 1604. The controller may generate a control signal based on the determined action. The control signal may include information indicating the determined action to the vehicle (e.g. the control system 200 of the vehicle). The controller 1604 may provide the control signal to the vehicle control system 1620. The reinforcement learning block 1603 may further receive instructions from the controller 1604.

The vehicle control system 1620 may receive the control signal which the controller 1604 provides and generate a vehicle control signal based on the received control signal in order to control the vehicle to perform the determined action. For example, the vehicle control signal 1620 may control the mobility system of the vehicle in order to perform actions that may relate to the mobility system of the vehicle based on the received control signal. The vehicle control system 1620 may control the interior systems of the vehicle in order to perform actions that may relate to the interior systems of the vehicle based on the received control signal.

For example, the vehicle control system 1620 may control the mobility system based on the control signal indicating the determined action includes a driving action. Accordingly, the vehicle control system 1620 may control the mobility system to adjust the speed, acceleration of the vehicle, or drive the vehicle according to the selected route as indicated by the received control signal. The vehicle control system 1620 may control the interior systems based on the control signal indicating the determined action includes an occupant action. Accordingly, the vehicle control system 1620 may control the interior systems to provide necessary adjustments to the seats, control the air-conditioner, provide information to the occupant via a user interface of the vehicle or the in-vehicle infotainment system, or display information based on the received control signal.

Furthermore, the vehicle control system 1620 may provide information indicating the determined action by the reinforcement learning model to the occupant. The vehicle control system 1620 may provide the information via the user interface of the vehicle or the in-vehicle infotainment system. The vehicle control system 1620 may further receive a response from the user via the user interface with respect to whether the occupant accepts the determined action to be performed, and the vehicle control system 1620 may provide instructions to corresponding systems in case the occupant accepts the determined action to be performed.

The vehicle control system 1620 may determine to provide the information or to request a response from the occupant based on the determined action. Alternatively, or additionally, the received control signal may indicate that the vehicle control system 1620 should provide information with respect to the determined action to the occupant, or the vehicle control system 1620 should request a response with respect to the determined action to the occupant. For example, the vehicle control system 1620 may request a response only on predetermined action types (e.g. changing the route).

Furthermore, the vehicle control system 1620 may provide information to perform the determined action by the reinforcement learning model to the occupant. The vehicle control system 1620 may provide the information via the user interface of the vehicle or the in-vehicle infotainment system. Such determined actions may include a request from the occupant to perform an action (e.g. directing gaze towards the driving direction, tilting the head up when the vehicle approaches a sharp bend, etc.). The vehicle control system 1620 may further receive a response from the user via the user interface or via sensors of the vehicle with respect to the occupant performing the action, and the vehicle control system 1620 may provide instructions to corresponding systems in case the occupant accepts the determined action to be performed. Such human-in-the-loop approach as described above may allow the reinforcement learning block 1603 to learn user preferences with respect to the determined actions.

The vehicle control system 1620 may communicate an indication with respect to the response of the occupant in these cases to the controller 1604. The vehicle control system 1620 may communicate the indication, in case the occupant does not accept (or refuse) the determined action to be performed. The controller 1604 may provide an indication with respect to the response of the occupant to the reinforcement learning block 1603. Accordingly, the reinforcement learning block 1603 may adjust model parameters 1611 in the memory 1610.

Furthermore, the reinforcement learning block 1603 may be configured to determine the actions (or to execute the reinforcement learning model) based on instructions received from the controller 1604. The controller 1604 may trigger the reinforcement learning block 1603 to execute the reinforcement learning model. For example, the controller 1604 may trigger the reinforcement learning block 1603 in case a motion sickness score which the estimator calculates is above (or below based on the algorithm) a predetermined threshold stored in the memory 1620. In other words, the controller 1604 may trigger the reinforcement block only when the detected motion sickness of the occupant is above a predetermined degree.

Based on the determined action for the determined state, the reinforcement learning block 1603 may calculate a reward value based on data indicating a motion sickness of the occupant. The reinforcement learning block 1603 may calculate the reward value the motion sickness scores 1613 stored in the memory 1610. The reinforcement learning block 1603 may calculate the reward value based on environmental data relating to a second instance of time. Accordingly, the reinforcement learning block 1603 may calculate the reward value based on a difference of a motion sickness score 1613 relating to the first instance of time (the instance of time which the corresponding action is determined) and a motion sickness score 1613 relating to the second instance of time. In one example, the reward value may equal the difference. Accordingly, the reinforcement learning block 1603 may update the model parameters 1611 in the memory based on the calculated reward value in response to the performed action and the determined state of the environment.

Figure 19:
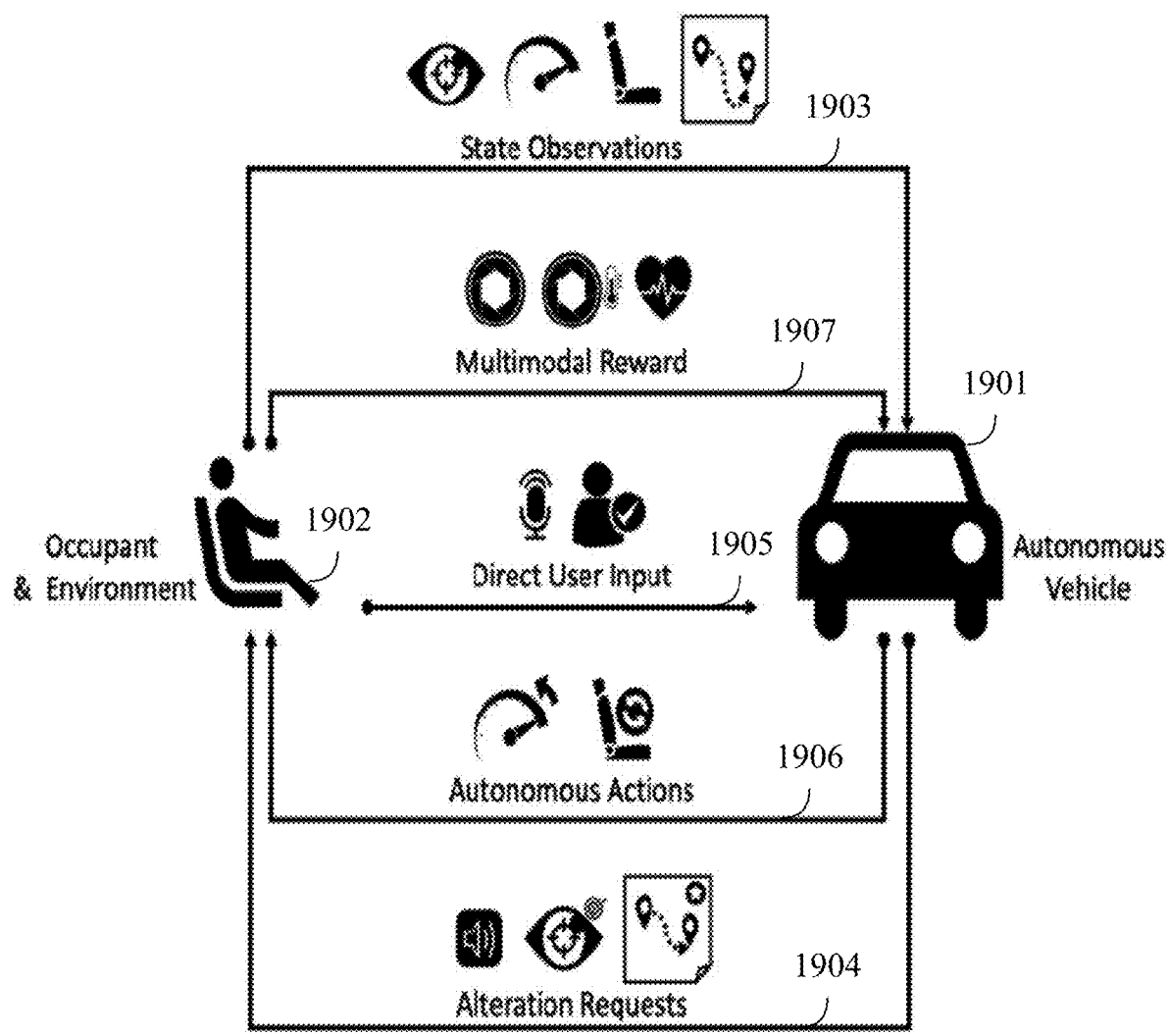
FIG. 19 shows schematically an exemplary overview of a vehicle system.

FIG. 19 shows schematically an exemplary overview of a vehicle system. The vehicle system includes an autonomous vehicle 1901. The autonomous vehicle 1902 may include the device for monitoring the occupant according to FIG. 13 including the processor according to FIG. 16. The vehicle 1901 may monitor the occupant and the driving environment 1902 continuously to receive state observations 1903. Based on the state observations, the vehicle 1901 may determine an action to be performed which the vehicle estimates that the performed action should provide the maximum reward with a reinforcement learning model.

The vehicle may 1901 provide information indicating the determined action as alteration requests 1904 to the occupant. The occupant 1902 may provide a response as a direct input 1905 to the vehicle 1901 with respect to the alternation request 1904. Based on the response of the occupant 1902, the vehicle 1901 may adjust model parameters of the reinforcement learning model (e.g. when the occupant refuses the alteration request) and may determine another action to be performed. The vehicle 1901 may perform the determined action 1906. Furthermore, the vehicle 1901 may calculate a reward value 1907 based on the monitoring of the occupant and the environment 1902 in response to the performed action 1906. The reward value 1907 may provide a feedback to the reinforcement learning model to adjust parameters of the reinforcement learning model based on the reward value 1907 which may be calculated according to the estimated degree of motion sickness of the occupant 1902.

In one aspect, the processor (e.g. the processor 1600) may be configured to execute a neural network to apply the reinforcement learning model based on the environmental data in the memory. The output of the neural network may include a determined action for an instance of time. The neural network may include an input layer, an output layer, and at least one layer (e.g. hidden layer(s)) between the input layer and the output layer. The neural network may be configured to perform calculations to provide the output from its output layer according to a plurality of model parameters in the memory. The model parameters may include a weight or a bias related to a neuron or a layer of the neural network according to a predetermined neural network model.

The neural network model may receive the environmental data indicating a state of the environment at an instance of time. The neural network may adjust the model parameters in the memory according to the determined action based on the indicated state of the environment at the instance of time and the feedback received based on the data indicating the motion sickness of the occupant at a later instance of time.

For example, the neural network model may initially be configured according to measurements taken while the vehicle is on a journey with at least an occupant in various road environments. Based on the taken measurements in various road environments, the model parameters may be adjusted based on the indicated state of the environment at the instance of time and the feedback received based on the data indicating the motion sickness of the occupant at a later instance of time.

The neural network model may include at least one layer with respect to determining a motion sickness score based on the environmental data. The neural network model may include at least one layer with respect to determining the motion sickness data based on occupant related information in the environmental data including data that may indicate a degree of motion sickness of an occupant. Accordingly, the neural network may calculate the reward value based on the determination of the motion sickness score. For example, the neural network model may classify the data received from sensors as mentioned in this disclosure, similar to the tasks which the estimating block of the processor may be configured to perform with respect to FIG. 16.

The neural network model may include model parameters configured to represent a reward function that may map the state of the environment at an instance of time which the neural network model may calculate based on the environmental data to an action to be performed. The neural network model may to adjust the model parameters related to the reward function based on the indicated state of the environment at the instance of time and the feedback received based on the data indicating the motion sickness of the occupant at a later instance of time (e.g. reward value). The neural network model may be configured to adjust the model parameters (e.g. neural network weights) representing the reward function accordingly.

Furthermore, the neural network model may adjust the model parameters based on an input received from the occupant in response to the determined action. For example, the neural network model may adjust the weights or biases with respect to a determined action which the occupant refuses for at least for a predetermined period of time (e.g. adjusting weights to 0 in case the occupant refuses the determined action).

Accordingly, at the inference stage, the neural network model may access the environmental data to determine an action to be performed by the vehicle which the neural network model estimates that the determined action will provide the maximum reward based on the model parameters. Based on the calculated reward value indicating a degree or a change of the degree of the motion sickness of the occupant according to detected motion sickness via sensors at a further instance of time after the vehicle has performed the action, the neural network model may adjust the model parameters to further train the neural network model.

Figure 20:
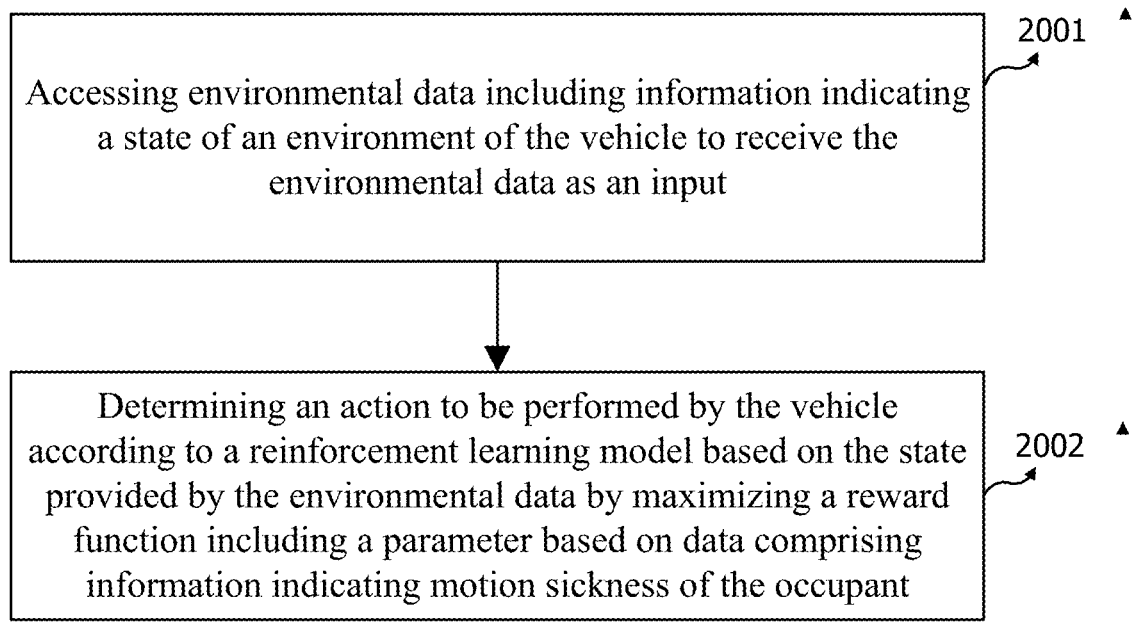
FIG. 20 shows schematically an example of a method.

FIG. 20 shows schematically an example of a method. The method may include accessing 2001 environmental data including information indicating a state of an environment of the vehicle to receive the environmental data as an input; and determining 2002 an action to be performed by the vehicle according to a reinforcement learning model based on the state provided by the environmental data by maximizing a reward function including a parameter based on data including information indicating motion sickness of the occupant. The method may be used as a method for reducing motion sickness. A non-transitory computer-readable medium including one or more instructions that cause a processor to perform the method.

The following examples pertain to further aspects of this disclosure.

In example 1A, the subject matter includes a device for controlling an active seat of a vehicle. The subject matter may include: a memory configured to store a transfer function; a processor configured to: predict an acceleration of the active seat of the vehicle based on a first sensor data and the transfer function, wherein the first sensor data includes information indicating an acceleration of a vibration source for the vehicle; generate a control signal to control a movement of the active seat at a first instance of time based on the predicted acceleration; adjust the transfer function based on a second sensor data including information indicating a detected acceleration of the active seat at the first instance of time.

In example 2A, the subject matter of example 1A, can optionally include that the processor is further configured to adjust the transfer function parameter based on the predicted acceleration of the active seat and the second sensor data. In example 3A, the subject matter of example 1A or example 2A, can optionally include that the first sensor data further includes information indicating at least one of: an angle of a steering wheel of the vehicle, a throttle of the vehicle, a brake of the vehicle.

In example 4A, the subject matter of any one of examples 1A to 3A, can optionally include that the first sensor data includes a plurality of sensor data items received from a plurality of IMU sensors. In example 5A, the subject matter of example 4A, can optionally include that at least one IMU sensor is configured to detect an acceleration of an engine of relative to the chassis of the vehicle. In example 6A, the subject matter of any one of examples 4A or 5A, can optionally include that at least one IMU sensor is configured to detect an acceleration of a wheel of the vehicle.

In example 7A, the subject matter of any one of examples 1A to 6A, can optionally include that the information indicating the acceleration of the vibration source includes information of a translational envelope may include an x-axis, a y-axis, and a z-axis. In example 8A, the subject matter of any one of examples 1A to 7A, can optionally include that the information indicating the acceleration of the vibration source includes information of a rotational envelope may include a rotation around the x-axis, a rotation around the y-axis, and a rotation around the z-axis.

In example 9A, the subject matter of any one of examples 1A to 8A, can optionally include that the memory is further configured to store a plurality of model parameters, and can optionally include that the processor is further configured to predict the acceleration of the active seat of the vehicle with the transfer function by applying a neural network model to the first sensor data according to the plurality of model parameters.

In example 10A, the subject matter of example 9, can optionally include that the neural network model includes a training mode configured to: predict the acceleration of the active seat of the vehicle based on a plurality of data items indicating an acceleration of the vibration source for a plurality of instances of time, adjust the plurality of model parameters based on the predicted acceleration, and a detected acceleration of each of the plurality of instances of time.

In example 11A, the subject matter of any one of examples 9 or 10A, can optionally include that the neural network model is configured to use a cost function that is configured to adjust at least one of the plurality of model parameters by penalizing a difference between the predicted acceleration and the detected acceleration of the active seat at the first instance of time. In example 12A, the subject matter of example 11A, can optionally include that the neural network model is configured to use the cost function to keep the difference between the predicted acceleration and the detected acceleration of the active seat below human sensitivity thresholds.

In example 13A, the subject matter of example 12A, can optionally include that the neural network model is configured to keep the difference between the predicted acceleration and the detected acceleration of the active seat below 0.1 m/s2 for each of the axes. In example 14A, the subject matter of any one of examples 11A to 13A, can optionally include that the cost function is configured to be equal to $|\ddot{X}_s-\ddot{X}_p|_2^2+\|\ddot{X}_s-\ddot{X}_p|-\vec{\omega}|_2^2$, can optionally include that $\ddot{X}_s$ is the detected acceleration, $X_p$ is the predicted acceleration, and $\vec{\omega}$ is a predefined threshold.

In example 15A, the subject matter of any one of examples 1A to 14A, can optionally include that the first sensor data includes information indicating the acceleration of the vibration source for a plurality of instances of time before the first instance of time. In example 16A, the subject matter of any one of examples 1A to 15A, can optionally include that the processor includes a feedforward proportional derivative controlling block configured to control the movement or actuation of the active seat e.g. controlling position, shape or other properties of the active seat of the active seat relative to the chassis of the vehicle at the first instance of time based on the predicted acceleration.

In example 17A, the subject matter of example 16A, can optionally include that the feedforward proportional derivative controlling block is configured to generate a first control signal based on the detected acceleration at a second instance of time, can optionally include that the second instance of time is before the first instance of time. In example 18A, the subject matter of any one of examples 16A or 17A, can optionally include that feedback proportional derivative controlling block configured to control the movement or actuation of the active seat e.g. controlling position, shape or other properties of the active seat of the active seat relative to the chassis of the vehicle at the first instance of time based on the detected acceleration.

In example 19A, the subject matter of example 18A, can optionally include that the feedback proportional derivative controlling block is configured to generate a second control signal based on the detected acceleration at the second instance of time. In example 20A, the subject matter of example 19A, can optionally include that the processor is further configured to generate the control signal based on the first control signal and the second control signal to control the movement or actuation of the active seat e.g. controlling position, shape or other properties of the active seat of the active seat relative to the chassis of the vehicle at the first instance of time based on the predicted acceleration.

In example 21A, the subject matter of any one of examples 19A or 20A, can optionally include that the processor is further configured to generate the control signal according to the detected acceleration of the active seat for the second instance of time based on the detected acceleration of the active seat for the second instance of time. In example 22A, the subject matter of any one of examples 19A to 21A, can optionally include that the processor is further configured to generate the control signal based on the first control signal and the second control signal, in case the detected acceleration of the active seat for the second instance of time is below a predefined threshold.

In example 23A, the subject matter of any one of examples 19A to 21A, can optionally include that the processor is further configured to activate a damping feedback control mode, in case the detected acceleration of the active seat for the second instance of time is above a predefined threshold. In example 24A, the subject matter of example 23A, can optionally include that the processor is configured to generate the control signal for the first instance of time only based on the second control signal in the damping feedback control mode. In example 25A, the subject matter of any one of examples 22A to 24A, can optionally include that the predefined threshold includes 0.1 m/s2 for at least one of the axes.

In example 26A, the subject matter of any one of examples 19A to 24A, can optionally include that the processor is further configured to activate a feedback off mode, in case a difference between a predicted acceleration for the second instance of time and the detected acceleration for the second instance of time is above a predefined threshold. In example 27A, the subject matter of example 26A, can optionally include that the processor is configured to not to generate the control signal during the feedback off mode.

In example 28A, the subject matter of example 26A, can optionally include that the processor is configured to generate a control signal indicating that the active seat is not to be moved. In example 29A, the subject matter of any one of examples 1A to 29A, can optionally include that the processor is configured to apply a reinforcement learning model according to a plurality of model parameters in the memory, can optionally include that the processor is configured to generate a reward metric based on the detected acceleration in response to the predicted acceleration, and can optionally include that the processor is configured to adjust the plurality of model parameters based on the reward metric.

In example 30A, the subject matter of any one of examples 1A to 29A, can optionally include that the control signal includes information indicating a movement of a translational envelope may include an x-axis, a y-axis, and a z-axis. In example 31A, the subject matter of any one of examples 1A to 30A, can optionally include that the control signal includes information indicating a movement of a rotational envelope may include a rotation around the x-axis, a rotation around the y-axis, and a rotation around the z-axis.

In example 32A, the subject matter includes an active seat system. The subject matter may further include: a device according to any one of examples 1A to 31A, and an active seat may include an interface configured to receive the control signal and provide the second sensor data. In example 33A, the subject matter of example 32A, can optionally include that the active seat includes an active seat having a 6 degrees of freedom, can optionally include that each of the 6 degrees of freedom are controlled by an actuator to move the seat in the degree of freedom based on the control signal, and can optionally include that each of the actuators are capable of delivering 55 Watts of power.

In example 34A, the subject matter of example 32A or 33A, can optionally include that each of the actuators are capable of delivering 110 Watts of power. In example 35A, the subject matter of any one of examples 32A to 34A, can optionally include that the interface is further configured to receive the first sensor data from at least one sensor configured to detect the acceleration of the vibration source of the vehicle.

In example 36A, a vehicle may include: an active seat system according to any one of examples 32A to 34; at least two wheels and a motor; a plurality of sensors, can optionally include that each of the plurality of sensors are configured to detect an acceleration of each of the at least two wheels and provide sensor data from an output; an engine sensor configured to detect an acceleration of the engine and provide an engine sensor data item from an output; an interface configured to receive data from the outputs of the sensors and provide the first sensor data to the active seat system.

In example 37A, A non-transitory computer-readable medium including one or more instructions that when executed on a processor, cause the processor to perform according to any one of examples 1A to example 36A, In example 38A, Method may include: predicting an acceleration of the active seat of the vehicle based on a first sensor data and a stored transfer function, can optionally include that the first sensor data includes information indicating an acceleration of a vibration source for the vehicle; generating a control signal to control a movement of the active seat at a first instance of time based on the predicted acceleration; adjusting the transfer function based on a second sensor data may include information indicating a detected acceleration of the active seat at the first instance of time.

In example 1B, the subject matter includes a device for monitoring an occupant of a vehicle, the subject matter may include: a processor configured to: access environmental data including information indicating a state of an environment of the vehicle to receive the environmental data as an input; and determine an action to be performed by the vehicle according to a reinforcement learning model based on the state provided by the environmental data by maximizing a reward function including at least one parameter based on sensor data including information indicating motion sickness of the occupant.

In example 2B, the subject matter of example 1B, wherein the reward function is further configured to provide a feedback to the reinforcement learning model based on the data including information indicating the motion sickness of the occupant. In example 3B, the subject matter of example 2B, wherein the reward function is further configured to provide the feedback to the reinforcement model based on a degree of the motion sickness of the occupant according to the data. In example 4B, the subject matter of example 4B, wherein the feedback provided by the reward function includes indication of the motion sickness of the occupant according to the data.

In example 5B, the subject matter of any one of examples 2B to 4B, wherein the feedback provided by the reward function includes indication a change of the degree of the motion sickness of the occupant based on the determined action. In example 6B, the subject matter of any one of examples 2B to 5B, wherein the processor is further configured to determine the action to be performed by the vehicle according to the reinforcement learning model based on the feedback that the reward function provides.

In example 7B, the subject matter of any one of examples 1B to 6B, wherein the data includes the information indicating motion sickness of the occupant based on a plurality of modalities. In example 8B, the subject matter of any one of examples 1B to 7B, wherein the data includes information indicating a change of estimated motion sickness of the occupant based on the plurality of modalities. In example 9B, the subject matter of any one of examples 7B or 8B, wherein the data includes a data item for each of the plurality of modalities, and wherein the reward function includes a weight parameter for each of the data items.

In example 10B. The subject matter of any one of examples 1B to 9B, wherein the processor is configured to update the reward function based on the data in response to the action performed by the vehicle. In example 11B, the subject matter of any one of examples 1B to 10B, can optionally include that the processor is configured to update the reward function by adjusting at least one weight parameter for at least one of the data items. In example 12B, the subject matter of examples 10B or 11B, can optionally include that the processor is further configured to determine a second action according to the updated reward function.

In example 13B, the subject matter of any one of examples 1B to 12B, can optionally include that the data includes an indication of at least one of the following: an estimated skin tone of the occupant, an estimated sweat response of the occupant, an estimated facial action of the occupant, an estimated breathing pattern of the occupant, or an estimated heart rate of the occupant. In example 14B, the subject matter of any one of examples 1B to 13B, can optionally include that the processor is configured to receive sensor input data from at least one sensor to estimate at least one of skin tone, facial action, sweat response, breathing pattern, or heart rate of the occupant; can optionally include that the processor is further configured to generate the data based on the estimation of the at least one of the skin tone, the facial action, the sweat response, the breathing pattern, or the heart rate of the occupant.

In example 15B, the subject matter of any one of examples 1B to 14B, can optionally include that the at least one sensor includes at least one of the following: a camera, a sweat sensor configured to detect sweating of the occupant, a breathing sensor configured to detect breathing of the occupant, a heart rate sensor configured to detect heart rate of the occupant. In example 16B, the subject matter of example 15B, can optionally include that at least one of the breathing sensor or the heart rate sensor is coupled to a seat of the vehicle.

In example 17B, the subject matter of examples 15B or 16B, can optionally include that at least one of the breathing sensor or the heart rate sensor is coupled to a seat belt of the vehicle. In example 18B, the subject matter of any one of examples 1B to 17B, can optionally include that the processor is configured to receive a plurality sensor input data from a plurality of sensors and generate the data based on a combination of the plurality sensor input data.

In example 19B, the subject matter of any one of examples 1B to 18B, can optionally include that the environmental data includes at least one of the following: driving information indicating a parameter related to a movement of the vehicle, interior information indicating a parameter related to a cabin of the vehicle in which the occupant is located, or occupant information indicating a parameter related to the occupant of the vehicle. In example 20B, the subject matter of example 19B, can optionally include that the driving information includes information indicating at least one of a speed of the vehicle, an acceleration of the vehicle, route of the vehicle.

In example 21B, the subject matter of example 20B, can optionally include that the information indicating the route of the vehicle includes information indicating at least one of a route of the vehicle in a period of time in the past, or a predicted route of the vehicle for a period of time in the future. In example 22B, the subject matter of example 21B, can optionally include that the information indicating the route of the vehicle includes information indicating an estimated curvedness degree of the route.

In example 23B, the subject matter of any one of examples 19B to 22B, can optionally include that the interior information includes information indicating at least one of a location of the occupant in the vehicle, position of a seat of the vehicle, or an angle of the seat relative to the movement of the vehicle. In example 24B, the subject matter of any one of examples 19B to 23B, can optionally include that occupant information includes at least one of a gaze of the occupant, or a head pose of the occupant.

In example 25B, the subject matter of any one of examples 1B to 24B, can optionally include that the processor is configured to determine the action to be performed by the vehicle by selecting an action from a plurality of predefined actions. In example 26B, the subject matter of example 25B, can optionally include that the plurality of actions includes at least one driving action and/or at least one occupant action. In example 27B, the subject matter of example 26B, can optionally include that the at least one driving action includes at least one of adjusting the speed of the vehicle, adjusting the acceleration/deacceleration of the vehicle, selecting a route from a plurality of predetermined routes.

In example 28B, the subject matter of examples 26B or 27B, can optionally include that the at least one occupant action includes at least one of adjusting a seat of the occupant, rotating a seat of the occupant, rotating the seat of the occupant to align the occupant with the movement of the vehicle, moving the seat of the occupant based on an acceleration of the vehicle, activating an air conditioner of the vehicle, adjusting the airways of the vehicle to provide stream of air towards the occupant, providing information indicating a change of the position of the occupant, indicating a gaze direction to the occupant, indicating a head posture to the occupant, or displaying a real or a virtual route-aligned content on a display of the vehicle.

In example 29B, the subject matter of any one of examples 1B to 28B, can optionally include that the processor is configured to output an output information indicating at least one of the determined action to receive a response from the occupant; can optionally include that the processor is configured to receive an input information in response to the output information, the input information may include information indicating the response of the occupant; can optionally include that the processor is configured to determine to generate a control signal indicating whether the at least one of the determined action is to be performed based on the response of the occupant.

In example 30B, the subject matter of example 29B, can optionally include that the processor is configured to adjust the reward function based on the response of the occupant. In example 31B, the subject matter of any one of examples 1B to 30B, further may include an interface configured to access the environmental data and to receive information related to the data. In example 32B, the subject matter of example 31B, can optionally include that the processor is configured to generate a vehicle control signal to indicate the determined action to the vehicle, can optionally include that the interface is configured to provide the vehicle control signal to the vehicle.

In example 33B, a vehicle may include: a device according to any one of examples 1B to 32; a sensor configured to provide information indicating the state of the environment of the vehicle; a vehicle interface configured to provide access for the environmental data to the device and receive a control signal indicating the determined action of the vehicle; a vehicle processor configured to: receive the information indicating the state of the environment, generate the environmental data based on the information indicating the state of the environment, receive the control signal and control the vehicle to perform the determined action.

In example 34B, the vehicle of example 33B, further may include: an occupant sensor configured to detect an indication of the motion sickness of the occupant. In example 35B, the vehicle of example 34B, can optionally include that the occupant sensor includes a camera, can optionally include that the vehicle processor is configured to estimate a feature related to the motion sickness of the occupant based on images received from the camera.

In example 36B, A non-transitory computer-readable medium including one or more instructions that when executed on a processor, cause the processor to perform according to any one of examples 1B to example 35B, In example 37B, Method may include: accessing to environmental data may include information indicating a state of an environment of the vehicle to receive the environmental data as an input; and determining an action to be performed by the vehicle according to a reinforcement learning model based on the state provided by the environmental data by maximizing a reward function may include at least one parameter based on data may include information indicating motion sickness of the occupant.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

The term "user device" is intended to refer to a device of a user (e.g. occupant) that may configured to provide information related to the user. The user device may exemplarily include a mobile phone, a smart phone, a wearable device (e.g. smart watch, smart wristband), a computer, etc.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "instance of time" refers to a time of a particular event or situation according to the context. The instance of time may refer to an instantaneous point in time, or to a period of time which the particular event or situation relates to.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, WiMax, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A device comprising:
    a memory configured to store a transfer function;
    a processor configured to:
        predict an acceleration of an active seat of a vehicle based on a first sensor data and the transfer function, wherein the first sensor data comprises information indicating an acceleration of a vibration source for the vehicle;
        generate a control signal to control an actuation of the active seat relative to a chassis of the vehicle at a first instance of time, wherein the control signal is generated by selectively operating in one of a first control mode or a second control mode,
        wherein the selection is based on a comparison of a detected acceleration of the active seat at a second instance of time, temporally before the first instance of time, with a predefined threshold,
        wherein, in the first control mode that is selected when the detected acceleration is below the predefined threshold, the control signal is generated based on the predicted acceleration and the detected acceleration, and
        wherein, in the second control mode that is selected when the detected acceleration is above the predefined threshold, the control signal is generated based on the detected acceleration without being based on the predicted acceleration;
        control the actuation of the active seat according to the control signal;
        adjust the transfer function based on a second sensor data comprising information indicating a detected acceleration of the active seat at the first instance of time.

2. The device of claim 1, wherein the actuation of the active seat comprises at least one of the following: a spatial movement of the active seat, an angular movement of the active seat, a spatial movement of a part of the active seat, an angular movement of a part of the active seat, a change of a shape of the active seat, and/or a change of at least one property of the active seat.

3. The device of claim 1, wherein the processor is further configured to adjust the transfer function based on the predicted acceleration of the active seat and the second sensor data.

4. The device of claim 1, wherein the first sensor data comprises information indicating at least one of an angle of a steering wheel of the vehicle, a throttle of the vehicle, or a brake of the vehicle comprising a plurality of sensor data items received from a plurality of inertial measurement unit (IMU) sensors,
wherein a first inertial measurement unit (IMU) sensor is configured to detect an acceleration of an engine,
wherein a second inertial measurement unit (IMU) sensor is configured to detect an acceleration of a wheel of the vehicle.

5. The device of claim 1, wherein the memory is further configured to store a plurality of model parameters,
wherein the processor is further configured to predict the acceleration of the active seat of the vehicle with the transfer function by applying a neural network model to the first sensor data according to the plurality of model parameters,
wherein the neural network model is configured to use a cost function that is configured to adjust at least one of the plurality of model parameters by penalizing a difference between the predicted acceleration and the detected acceleration of the active seat at the first instance of time.

6. The device of claim 5, wherein the neural network model is configured to use the cost function to keep the difference between the predicted acceleration and the detected acceleration of the active seat below a predefined human sensitivity threshold, wherein the cost function is configured to be equal to $|\ddot{X}_s-\ddot{X}_p|_2^2+\||\ddot{X}_s-\ddot{X}_p|-\vec{\omega}|_2^2$, wherein $\ddot{X}_s$ is the detected acceleration, $\ddot{X}_p$ is the predicted acceleration, and $\vec{\omega}$ is a predefined threshold.

7. The device of claim 5,
wherein the neural network model is configured to use the cost function to keep the difference between the predicted acceleration and the detected acceleration of the active seat below a predefined human sensitivity threshold.

8. The device of claim 7,
wherein that the neural network model is configured to keep the difference between the predicted acceleration and the detected acceleration of the active seat below 0.1 m/s2 for each axis.

9. The device of claim 1,
wherein the processor comprises a feedforward proportional derivative controlling block configured to control the actuation of the active seat relative to a chassis of the vehicle at the first instance of time based on the predicted acceleration,
wherein the feedforward proportional derivative controlling block is configured to generate a first control signal based on the detected acceleration at a second instance of time,
wherein the second instance of time is temporally before the first instance of time.

10. The device of claim 9,
wherein the processor comprises a feedback proportional derivative controlling block that is configured to generate a second control signal based on the detected acceleration at the second instance of time,
wherein the processor is further configured to generate the control signal based on the first control signal and the second control signal to control the actuation of the active seat relative to the chassis of the vehicle at the first instance of time based on the predicted acceleration.

11. The device of claim 10,
wherein the processor is further configured to:
generate the control signal based on the first control signal and the second control signal, in case the detected acceleration of the active seat for the second instance of time is below a predefined threshold;
activate a damping feedback control mode, in case the detected acceleration of the active seat for the second instance of time is above a predefined threshold;
generate the control signal for the first instance of time only based on the second control signal in the damping feedback control mode.

12. The device of claim 10,
wherein the processor is further configured to activate a feedback off mode, in case a difference between a predicted acceleration for the second instance of time and the detected acceleration for the second instance of time is above a predefined threshold,
wherein the processor is further configured to indicate that the active seat is not to be moved.

13. The device of claim 10,
wherein the predefined threshold comprises 0.1 m/s2 for at least one axis.

14. The device of claim 1,
wherein the processor is further configured to:
apply a reinforcement learning model according to a plurality of model parameters in the memory;
generate a reward metric based on the detected acceleration in response to the predicted acceleration; and
adjust the plurality of model parameters based on the reward metric.

15. The device of claim 1,
wherein the information indicating the acceleration of the vibration source comprises information of a translational envelope comprising an x-axis, a y-axis, and a z-axis.

16. The device of claim 1,
wherein the information indicating the acceleration of the vibration source comprises information of a rotational envelope comprising a rotation around an x-axis, a rotation around a y-axis, and a rotation around a z-axis.

17. The device of claim 1,
wherein the memory is further configured to store a plurality of model parameters, wherein the processor is further configured to predict the acceleration of the active seat of the vehicle with the transfer function by applying a neural network model to the first sensor data according to the plurality of model parameters, wherein the neural network model comprises a training mode configured to: predict the acceleration of the active seat of the vehicle based on a plurality of data items indicating an acceleration of the vibration source for a plurality of instances of time, adjust the plurality of model parameters based on the predicted acceleration and a detected acceleration of each of the plurality of instances of time.

18. The device of claim 1,
wherein the control signal comprises information indicating at least one of a movement of a translational envelope comprising an x-axis, a y-axis, and a z-axis or a movement of a rotational envelope comprising a rotation around the x-axis, a rotation around the y-axis, and a rotation around the z-axis.

19. A non-transitory computer-readable medium including one or more instructions that when executed on a processor, cause the processor to:
predict an acceleration of an active seat of a vehicle based on a first sensor data and a transfer function stored in a memory, wherein the first sensor data comprises information indicating an acceleration of a vibration source for the vehicle;
generate a control signal to control an actuation of the active seat relative to a chassis of the vehicle at a first instance of time, wherein the control signal is generated by selectively operating in one of a first control mode or a second control mode,
wherein the selection is based on a comparison of a detected acceleration of the active seat at a second instance of time, temporally before the first instance of time, with a predefined threshold,
wherein, in the first control mode that is selected when the detected acceleration is below the predefined threshold, the control signal is generated based on the predicted acceleration and the detected acceleration, and
wherein, in the second control mode that is selected when the detected acceleration is above the predefined threshold, the control signal is generated based on the detected acceleration without being based on the predicted acceleration;
control the actuation of the active seat according to the control signal;

adjust the transfer function based on a second sensor data comprising information indicating a detected acceleration of the active seat at the first instance of time.

20. The non-transitory computer-readable medium of claim 19,
wherein the control signal and/or the information indicating the acceleration of the vibration source comprises information indicating a movement of a translational envelope comprising an x-axis, a y-axis, and a z-axis and a movement of a rotational envelope comprising a rotation around the x-axis, a rotation around the y-axis, and a rotation around the z-axis.

* * * * *